United States Patent
Clucas et al.

(10) Patent No.: US 12,312,087 B2
(45) Date of Patent: May 27, 2025

(54) PRM-ACCESSIBLE AIRCRAFT LAVATORY

(71) Applicant: ST ENGINEERING AEROSPACE LTD., Paya Lebar (SG)

(72) Inventors: Daniel William Clucas, London (GB); Anthony Ralph Palliser Hudson, London (GB); Mitchell Anderw Johnstone, London (GB); Raymond John Bettell, London (GB)

(73) Assignee: ST ENGINEERING AEROSPACE LTD, Paya Lebar (SG)

( * ) Notice: Subject to any disclaimer, the term of this patent is extended or adjusted under 35 U.S.C. 154(b) by 138 days.

(21) Appl. No.: 17/606,083

(22) PCT Filed: Aug. 19, 2020

(86) PCT No.: PCT/SG2020/050481
§ 371 (c)(1),
(2) Date: Oct. 25, 2021

(87) PCT Pub. No.: WO2021/040615
PCT Pub. Date: Mar. 4, 2021

(65) Prior Publication Data
US 2022/0306297 A1  Sep. 29, 2022

(30) Foreign Application Priority Data
Aug. 30, 2019  (SG) ............... 10201908047P

(51) Int. Cl.
*B64D 11/02* (2006.01)
*B64D 11/00* (2006.01)
(52) U.S. Cl.
CPC ...... *B64D 11/02* (2013.01); *B64D 2011/0046* (2013.01)

(58) Field of Classification Search
CPC ................................................ B64D 11/02
See application file for complete search history.

(56) References Cited

U.S. PATENT DOCUMENTS 6,079,669 A * 6/2000 Hanay ............... B64D 11/02
 4/312
6,293,612 B1  9/2001 Crean
(Continued)

FOREIGN PATENT DOCUMENTS

DE  102016104927 A1  9/2017
EP  2803577 A1  11/2014
(Continued)

OTHER PUBLICATIONS

AIDA—Crystal Cabin Award Submission, dated: Unknown.
(Continued)

*Primary Examiner* — Philip J Bonzell
*Assistant Examiner* — Eric Acosta
(74) *Attorney, Agent, or Firm* — Thomas | Horstemeyer, LLP

(57) ABSTRACT

An accessible lavatory unit (103) for an aircraft cabin (102) is disclosed. The lavatory unit (103) is configurable between an able-bodied configuration and a PRM-accessible configuration. In the able-bodied configuration the lavatory unit has a first internal floor space (132) and there is a cabin floor space (130) external to the lavatory unit (103). The lavatory unit (103) is expandable into the PRM-accessible configuration in which the lavatory unit (103) is expanded to have a second internal floor space (132), the second internal floor space (132) encompassing a region of the cabin floor space (130). A sink for an aircraft lavatory unit is also disclosed.

20 Claims, 15 Drawing Sheets

(56) References Cited

U.S. PATENT DOCUMENTS

| | | |
|---|---|---|
| 9,428,274 B2 | 8/2016 | Moje et al. |
| 2002/0062521 A1 | 5/2002 | Itakura |
| 2013/0105626 A1 | 5/2013 | Drews et al. |
| 2013/0126672 A1 | 5/2013 | Weitzel et al. |
| 2013/0206907 A1* | 8/2013 | Burrows ............... B64D 11/02 244/118.5 |
| 2014/0123571 A1* | 5/2014 | Swain ............... B64D 11/0023 29/401.1 |
| 2014/0339363 A1 | 11/2014 | Moje et al. |
| 2016/0272321 A1 | 9/2016 | Ivester et al. |
| 2017/0267353 A1 | 9/2017 | McIntosh et al. |
| 2017/0320580 A1 | 11/2017 | Roth et al. |
| 2018/0251222 A1* | 9/2018 | Banfield ............... E04H 1/1216 |
| 2019/0248495 A1 | 8/2019 | Seibt |

FOREIGN PATENT DOCUMENTS

| | | | |
|---|---|---|---|
| WO | 19077476 A1 | 12/1899 | |
| WO | WO-2014154758 A1 * | 10/2014 | ............. A47K 17/02 |

OTHER PUBLICATIONS

PCT Search Report in co-pending related PCT Application No. PCT/SG2020/050481, mailed Jul. 12, 2020.
Extended European Search Report in related, co-pending EP Application No. 20857597.7, mailed Apr. 28, 2022.

\* cited by examiner

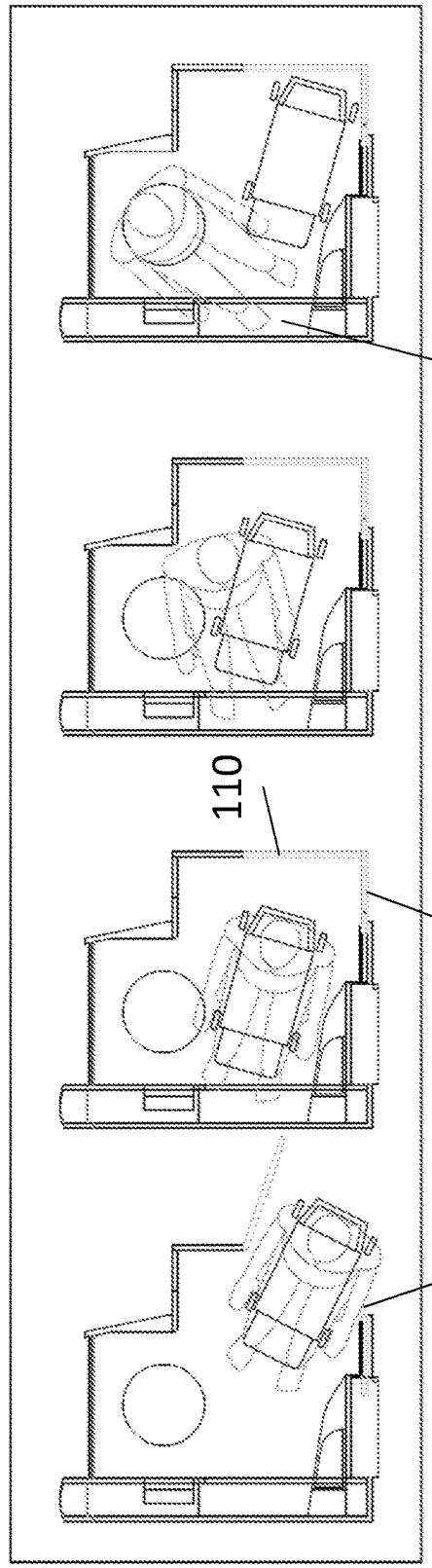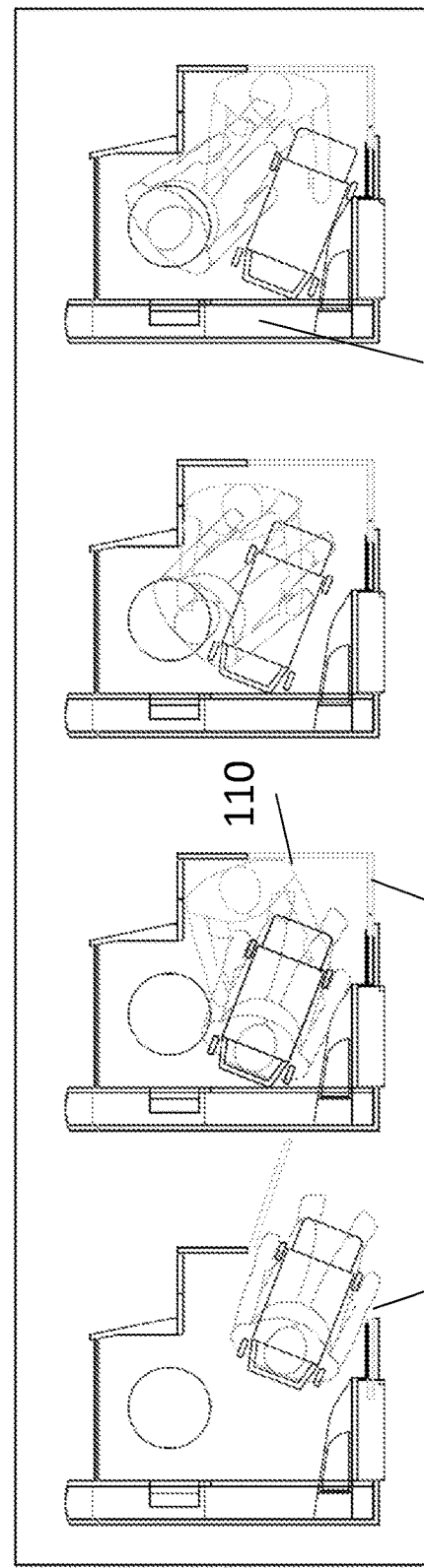

PRM-ACCESSIBLE AIRCRAFT LAVATORY

CROSS REFERENCE TO RELATED APPLICATIONS

This application is the 35 U.S.C. § 371 national stage application of PCT Application No. PCT/SG2020/050481, filed Aug. 19, 2020, which application claims the benefit of Singapore Application No. 10201908047P, filed Aug. 30, 2019, both of which are hereby incorporated by reference herein in their entireties.

FIELD OF THE INVENTION

The present invention concerns the accessibility of aircraft lavatories. More particularly, but not exclusively, this invention concerns a lavatory unit for an aircraft that is configurable between an able-bodied configuration and a PRM-accessible configuration. The invention also concerns an aircraft comprising such a lavatory unit and a method of reconfiguring an aircraft lavatory unit to enable access by a PRM (Person of Reduced Mobility).

BACKGROUND OF THE INVENTION

It is important that PRMs (Persons of Reduced Mobility) are able to access aircraft lavatory facilities in a dignified manner. A PRM-accessible aircraft lavatory should be able to accommodate a PRM in a wheelchair and allow for a transfer from the wheelchair to the toilet. A PRM-accessible aircraft lavatory should also be able to accommodate an assistant when one is required by a PRM. Providing a lavatory unit that meets these requirements within the space limitations of a commercial passenger aircraft cabin layout is not straightforward.

It is known to provide a PRM-accessible aircraft lavatory by having a larger lavatory unit with sufficient space inside to accommodate a wheelchair but increasing the size of the lavatory unit may require a corresponding reduction in the amount of passenger seating in the aircraft cabin which is not desirable from a commercial perspective.

It is also known to provide a PRM-accessible aircraft lavatory by having a lavatory unit comprising two toilets, divided by a partition. When a PRM needs access to the lavatory unit the partition is removed and/or reconfigured to open out the space within the lavatory unit. As there are two toilets in the unit the additional accessible floor space provided by removing the partition is limited. Further, in this configuration both toilets are occupied when the lavatory unit is being used by a PRM. This is not desirable from the point of view of the comfort of other passengers. Further, the two-toilet lavatory unit is necessarily larger than a single-toilet lavatory unit which may cause difficulties in integrating such a unit into an aircraft cabin layout. The partition system may also be difficult for crew to use.

It is also known to provide a lavatory unit of a relatively conventional size, but with the toilet and other internal furniture arranged in a manner that seeks to improve the accessibility by a PRM. However, such arrangements tend to be impractical and undesirable for PRMs because the useable space still tends to be very limited.

EP 1,209,078 discloses a box-shaped lavatory body including a storage module that can be pulled out of and stowed back into the body. Said storage module may be a closet for storing the coats and jackets of passengers. In use, the closet is pulled out of the lavatory body expanding the lavatory unit. The additional space inside the lavatory body vacated by the storage module when pulled out makes it more comfortable for a user to change their clothes within the lavatory body.

The present invention seeks to mitigate the above-mentioned problems. Alternatively or additionally, the present invention seeks to provide an improved aircraft lavatory unit, in particular a PRM-accessible lavatory unit.

SUMMARY OF THE INVENTION

The present invention provides a lavatory unit for an aircraft cabin. The lavatory unit may be configurable between an able-bodied configuration and a PRM-accessible configuration. It may be that in the able-bodied configuration the lavatory unit has a first internal floor space and/or there is a cabin floor space external to the lavatory unit. It may be that the lavatory unit is expandable into the PRM-accessible configuration in which the lavatory unit is expanded to have a second internal floor space. The second internal floor space may encompass a region of the cabin floor space.

Thus, lavatory units in accordance with the present invention can be reconfigured to increase the internal floor space by encompassing additional cabin space and thereby enable access by a PRM but otherwise occupy a smaller amount of space within the cabin when in the able-bodied configuration (which may be the configuration used the majority of the time).

In the able-bodied configuration the lavatory unit is suitable for use, as a lavatory unit, by an able-bodied passenger. For example, in the able-bodied configuration, the size and layout of the unit is such that a toilet in the lavatory unit is readily accessible and useable by an able-bodied passenger. In the able-bodied configuration, the lavatory unit is preferably not in a configuration in which it is not readily useable by a passenger. For example, in the able-bodied configuration, the lavatory unit is preferably not in a stowed, or otherwise collapsed, configuration that required deployment in order to become useable. It may be that in the able-bodied configuration the lavatory unit is not suitable for use, as a lavatory unit, by a PRM. For example, in the able-bodied configuration, the size and layout of the unit may be such that a toilet in the lavatory unit is not readily accessible and useable by a PRM.

The internal floor space of the unit may be defined as space in the region of a floor of the unit via which a user accesses the facilities (for example a toilet, sink etc) contained within the unit. In use, the feet and lower limbs of a user and/or a wheelchair may be located on the internal floor space. The internal floor space may comprise the exposed portion of the floor of the unit and/or the portion of the floor of the unit that is useable by an occupant of the lavatory unit. The internal floor space may comprise a region extending above, for example upwards from, the exposed portion of the floor of the unit. The internal floor space may comprise a substantially flat surface, for example spanning the region between cabin floor space external to the lavatory unit and the facilities (for example the toilet, sink etc.) contained therein. In the context of accessible lavatory units such as the unit described herein, the internal floor space may be defined as the accessible area of the floor, that is to say the portion of the floor of the unit that is accessible for a wheeled mobility aid, for example a wheelchair. Thus, it may be that the internal floor space does not include any steps, recesses and/or other features that would prevent the wheel of a wheeled mobility aid travelling across the floor space. It may be that the internal floor space comprises a ramp suitable for use by a wheeled mobility aid.

It will be appreciated that the region of cabin floor space encompassed by the second internal floor space need not necessarily be exposed to a user within the lavatory unit. That is to say, there may be a floor surface of the lavatory unit that covers said region the cabin floor in the PRM-accessible configuration, for example a portion of the perimeter wall (see below) and/or a bottom side of the lavatory unit (see below). Alternatively, it may be that the region of cabin floor space encompassed by the second internal floor space is exposed to a user within the lavatory unit. It may be that the region of cabin floor space encompassed by the second internal floor space is not covered by a floor surface of the lavatory unit.

It may be that the region of the cabin floor space encompassed by the second internal floor space was external to the lavatory unit in the able-bodied configuration.

The lavatory unit may comprise a perimeter wall that separates an internal space of the unit from space external to the unit. The perimeter wall may comprise a moveable wall assembly. It may be that in the able-bodied configuration the moveable wall assembly is in a retracted configuration. It may be that the moveable wall assembly is moveable into an expanded configuration to expand the lavatory unit into the PRM-accessible configuration.

Thus, the lavatory unit may be reconfigured into the PRM-accessible configuration (and back into the able-bodied configuration) by moving the moveable wall assembly. A moveable wall assembly may be a versatile and/or user-friendly way of providing additional internal floor space. The moveable wall assembly is moveable between a retracted configuration (e.g. its configuration when the lavatory unit is in the able-bodied configuration) and an expanded configuration (e.g. its configuration when the lavatory unit is in the PRM-accessible configuration). The lavatory unit may be reconfigured into the PRM-accessible configuration (and back into the able-bodied configuration) by displacing, for example in a movement comprising a translation of the moveable wall assembly, the moveable wall assembly.

In the able-bodied configuration the internal space of the unit may include the first internal floor space. In the PRM-accessible configuration the internal space of the unit may include the second internal floor space.

The moveable wall assembly may be mounted for movement relative to a stationary portion of the perimeter wall. The perimeter wall may define some or all of the forward, aft, inboard, outboard, top and bottom sides of the unit. Alternatively, the lavatory unit may be configured to abut a portion of aircraft structure, for example the cabin wall and/or fuselage such that the perimeter wall does not entirely encompass the interior space of the unit.

The lavatory unit, for example the moveable wall assembly, may comprise at least one panel assembly configured to cover a gap that would otherwise be created in the perimeter wall of the lavatory unit when the lavatory unit is expanded, for example as the moveable wall assembly moves from the retracted configuration to the expanded configuration.

The panel assembly may be connected to the lavatory unit such that movement of the unit from the able-bodied configuration to PRM-accessible configuration causes the panel assembly to cover the gap. It may be that in the able-bodied configuration the panel assembly is in a first position. It may be that the panel assembly is reconfigurable, for example expandable, so as to cover a gap that would otherwise be created in the perimeter wall of the lavatory unit when the lavatory unit is expanded. The panel may be expandable, for example the panel may unfold, unroll, stretch and or slide to increase its size in order to cover the gap. The panel assembly may be connected to a fixed part of the perimeter wall and to the rest of the moveable wall assembly such that movement of the moveable wall assembly reconfigures, for example expands, the panel assembly. The lavatory unit, for example the moveable wall assembly may comprise more than one panel assembly, for example a plurality of panel assemblies of the same or different types, each panel assembly being configured to cover a gap that would otherwise be created in the perimeter wall of the lavatory unit when the lavatory unit is expanded, for example as the moveable wall assembly moves from the retracted configuration to the expanded configuration.

A panel assembly may comprise one or more foldable panels, for example a bi-fold panel, that expands by unfolding.

A panel assembly may comprise one or more sliding panel(s), for example one or more panel(s) slidably mounted for movement relative to the moveable wall assembly and, optionally, relative to each other. It may be that the or each panel slides from a first position when the lavatory unit is in the able-bodied configuration to a second position when the lavatory unit is in the PRM-accessible configuration and thereby covers a gap that would otherwise be created in the perimeter wall of the lavatory unit as the moveable wall assembly moves between the retracted configuration and the expanded configuration.

A panel assembly may comprise an insert panel configured to be received in a gap in the perimeter wall created by movement of the moveable wall assembly from the retracted configuration to the expanded configuration.

The lavatory unit may comprise a door assembly. It may be that in the able-bodied configuration the door assembly is operable to an open position in which an able-bodied user can access the first internal floor space, for example via a first door opening in the perimeter wall. The first door opening may have a first effective width. The door assembly may be operable to a closed position in which the door prevents access to the first internal floor space via said first door opening. It may be that the first effective width is insufficient to permit access to the internal floor space by a PRM.

It may be that in the PRM-accessible configuration the door assembly is operable to an open position in which a PRM can access the internal floor space, for example via a second door opening in the perimeter wall. The second door opening may have a second effective width. The door assembly may be operable to a closed position in which the door prevents access to the internal floor space via said second door opening. It may be that the second effective width is different from, and preferably greater than, the first effective width.

Use of a door assembly that provides a greater effective width in a PRM-accessible configuration than in the able-bodied configuration may allow the lavatory unit to be smaller in the able-bodied configuration than an equivalent unit with a door having a fixed effective width. Additionally or alternatively, use of such a door assembly may increase design flexibility regarding the route by which a PRM enters the unit from within the aircraft cabin, for example regarding which side(s) of a unit comprise a door opening.

The effective width of a door opening may be defined as the minimum straight line distance between the two sides of a door opening. Thus, it may be that the effective width of the door opening determines whether a lavatory unit is PRM-accessible. In order to be PRM-accessible, the effective width of the doorway must be sufficient to allow a PRM using an aircraft wheelchair to pass through the door opening. The effective minimum width of the door opening in the able-bodied configuration (i.e. the first effective minimum width) may be 16 inches. The effective minimum width of the door opening in the PRM-accessible configuration (i.e. the second effective minimum width) may be 22 inches. It will be appreciated that an able-bodied user can turn sideways in order to enter the lavatory unit and accordingly in the able-bodied configuration it is not necessary for the door opening to accommodate the shoulder width of a 95$^{th}$ percentile man. In contrast, a PRM in a wheelchair cannot turn sideways and reduce their width in the same way. Accordingly, it may be that the effective minimum width of the door opening in the PRM-accessible configuration accommodates the shoulder width of a 95$^{th}$ percentile man.

It may be that the moveable wall assembly comprises the door assembly.

Providing the door assembly as part of the moveable wall assembly may facilitate use of the lavatory unit in a PRM-accessible configuration.

When the door assembly is in the open position, and the lavatory unit is in the PRM-accessible configuration, a PRM can preferably access the region of the cabin floor space in the second internal floor space, through the second door opening. The region of the cabin floor space in the second internal floor space is preferably directly adjacent the second door opening (inside the lavatory unit).

The door assembly may comprise a primary door and/or a secondary door. It may be that the primary door provides access to the first door opening. It may be that the primary door and the secondary door cooperate to provide access to the second door opening.

Thus, an able-bodied user may access the interior of the lavatory unit via the primary door (only) when the lavatory unit is in the able-bodied configuration. A PRM may access the interior of the lavatory unit via a combination of the primary door and the secondary door when the lavatory unit is in the PRM-accessible configuration. Such an arrangement may be a space efficient, user friendly and/or mechanically simple way of providing a door assembly that provides a greater effective width in a PRM-accessible configuration than in the able-bodied configuration. The primary door may be mounted for movement between the open and closed positions when the lavatory unit is in the able-bodied configuration. The position of the secondary door may be fixed when the lavatory unit is in the able-bodied configuration. The primary door may be mounted for movement between the open and closed positions when the lavatory unit is in the PRM-accessible configuration. The secondary door may be mounted for movement between the open and closed positions when the lavatory unit is in the PRM-accessible configuration. The door assembly may comprise more than one secondary door.

The primary door may define a door opening having a first shape and/or area. Each secondary door may define a door opening having a second or further shape and/or area. The first door opening may have the first shape and/or area. The second door opening may have a shape and/or area formed by a combination of the first shape and/or area and the second shape and/or area (and optionally any further shape and/or area of any additional secondary doors).

A door (for example the primary and/or secondary door) may be moveably mounted, for example (but not limited to) pivotally, slidably and/or rotatably mounted to another part of the perimeter wall. In that case the door may be a substantially rigid member, for example a panel. Additionally and/or alternatively the door may be flexible, for example the door may roll and unroll between the open and closed position.

The door assembly may comprise a catch and/or lock configured to hold the door(s) in the closed position when a user is inside the lavatory unit.

The interior space of the lavatory unit may be defined, at least in part, by the perimeter wall. The lavatory unit may be shaped and configured to interface with one or more cabin surfaces, for example a cabin wall, a portion of fuselage, a bulkhead and/or a cabin floor. Thus, in use, the interior space of the lavatory unit may also be defined by a cabin surface. It will therefore be appreciated that it is not necessary for the perimeter wall to entirely enclose the interior space of the lavatory unit. A lavatory unit may have one or more sides. In the case that the interior space is defined by a cabin surface(s), such sides may be notional when the lavatory unit is separate from the aircraft but will nevertheless by apparent to the skilled person. The lavatory unit may have at least four sides, for example providing a lavatory unit that is substantially square and/or rectangular when viewed from above. The lavatory unit may have at least six sides, for example providing a lavatory unit that is substantially cuboidal. At least one of said sides may be curved, to match the curve of the aircraft fuselage and/or cabin wall. The lavatory unit may have a forward side and an aft side, each of the forward and aft side extending substantially perpendicular to the longitudinal axis of the aircraft, the forward side being located closer to the nose of the aircraft than the aft side. The lavatory unit may have an inboard side and an outboard side, each of the inboard side and the outboard side extending substantially parallel to the longitudinal axis of the aircraft, the inboard side being located closer to the centreline of the aircraft than the outboard side. The lavatory unit may have a top side and a bottom side, each of the top side and the bottom side extending substantially parallel to the longitudinal axis of the aircraft, the top side being located above the bottom side. Thus, the lavatory unit may have a forward, aft, inboard, outboard, top and/or bottom side, forward, aft, inboard, outboard, top and bottom being defined as set out above.

The perimeter wall may have one or more sides, each side of the perimeter wall corresponding to, for example defining a side of the lavatory unit. Thus, the perimeter wall may have a forward, aft, inboard, outboard, top and/or bottom side, forward, aft, inboard, outboard, top and bottom being defined as set out above. The moveable wall assembly may define some or all of the forward, aft, inboard, outboard, top and/or bottom sides of the unit.

The region of cabin floor space encompassed within the second internal floor space when the lavatory unit is expanded may be located aft of the lavatory unit when the lavatory unit is in the able-bodied configuration. Said region of cabin floor space may be located aft of and/or immediately adjacent to the aft side of the lavatory unit when the lavatory unit is in the able-bodied configuration. Thus, it may be that the lavatory unit expands rearwards, e.g. into a space aft of the lavatory unit. Such an arrangement has been found to be beneficial because it may enable the lavatory unit, when in the PRM-accessible configuration, to temporarily occupy an area to the aft of the unit. In some cabin layouts, for example if the lavatory unit is located immediately forward of an aircraft door, this aft-most area tends to be less frequented by passengers than other areas of the aircraft cabin, so expanding into this area may minimise disruption.

Alternatively, in some embodiments the region of cabin floor space encompassed within the second internal floor space when the lavatory unit is expanded may be located forward of the lavatory unit when the lavatory unit is in the able-bodied configuration. Said region of cabin floor space may be located forward of and/or immediately adjacent to the forward side of the lavatory unit when the lavatory unit is in the able-bodied configuration. Thus, it may be that the lavatory unit expands forward, e.g. into a space forward of the lavatory unit. Such an arrangement has been found to be beneficial because it may enable the lavatory unit, when in the PRM-accessible configuration, to temporarily occupy an area forward of the unit. In some cabin layouts, for example if the lavatory unit is located immediately aft of an aircraft door, this forward-most area tends to be less frequented by passengers than other areas of the aircraft cabin, so expanding into this area may minimise disruption.

The moveable wall assembly may comprise a substantial portion of the perimeter wall, for example the majority of at least one side of the unit. The height of the moveable wall assembly may be substantially equal to the height of the lavatory unit. The moveable wall assembly may comprise a portion of perimeter wall, said wall portion having a thickness very much less than its width and/or height. Said wall portion may be substantially planar.

The moveable wall assembly may define, at least in part, one or more sides of the lavatory unit. The moveable wall assembly may define, at least in part, the aft side of the lavatory unit, for example the majority of the aft side of the lavatory unit. The moveable wall assembly may define said part of the aft side of the lavatory unit when the lavatory unit is in both the able-bodied configuration and the PRM-accessible configuration. In the PRM-accessible configuration, the moveable wall assembly may define, at least in part, the inboard side of the lavatory unit, for example a minority of the inboard side of the lavatory unit. In the PRM-accessible configuration, the moveable wall assembly may define, at least in part, the top side of the lavatory unit, for example a minority of the top side of the lavatory unit. In the PRM-accessible configuration, the moveable wall assembly may define, at least in part, the bottom side of the lavatory unit, for example a minority of the bottom side of the lavatory unit.

The door assembly may be located (at least in part) on the aft side of the lavatory unit. Such an arrangement has been found to be beneficial because it may enable a user to access the lavatory unit, when in the PRM-accessible configuration, from an area to the aft of the unit. This aft-most area tends to be less frequented by passengers than other areas of the aircraft cabin, particularly if an aircraft door is located aft of the unit, so this arrangement may minimise disruption. The primary door may be located on the aft side of the lavatory unit. When the primary door is in the closed configuration, the primary door may define, at least in part, the aft side of the perimeter wall. The secondary door may be located on the inboard side of the lavatory unit. When the lavatory unit is in the PRM-accessible configuration and the secondary door is in the closed position the secondary door may define, at least in part, the inboard side of the perimeter wall. The primary door and secondary door may together define a corner, for example the aft/inboard corner of the lavatory unit (when in the closed position).

The door assembly may be located (at least in part) on the forward side of the lavatory unit. Such an arrangement has been found to be beneficial because it may enable a user to access the lavatory unit, when in the PRM-accessible configuration, from an area forward of the unit. This forward-most area tends to be less frequented by passengers than other areas of the aircraft cabin, particularly if an aircraft door is located forward of the unit, so this arrangement may minimise disruption. The primary door may be located on the forward side of the lavatory unit. When the primary door is in the closed configuration, the primary door may define, at least in part, the forward side of the perimeter wall. The secondary door may be located on the inboard side of the lavatory unit. When the lavatory unit is in the PRM-accessible configuration and the secondary door is in the closed position the secondary door may define, at least in part, the inboard side of the perimeter wall. The primary door and secondary door may together define a corner, for example the forward/inboard corner of the lavatory unit (when in the closed position).

The lavatory unit may comprise a toilet, for example located adjacent the outboard side of the unit, for example such that a user has their back to the outboard side of the unit when sitting on the toilet. The lavatory unit may comprise a single toilet. It may be that the lavatory unit does not comprise a shower and/or more than one toilet.

The lavatory unit may comprise a crew seat mounted on an inboard side of the unit. The crew seat may be a foldable seat. Such an arrangement has been found to be beneficial because it enables the space normally occupied by the crew seat (typically to the aft of a lavatory unit) to be freed up, and instead be used for the PRM-accessible configuration.

It may be that in the PRM-accessible configuration, the interior space of the lavatory unit comprises a recess sized and shaped to receive the knees of a PRM sitting on the toilet and/or a PRM sitting in a wheelchair received within the lavatory unit. The recess may be defined by the interior surface of the forward side of the lavatory unit and/or perimeter wall. The recess may have a height (i.e. vertical extent) of 29 inches. The recess may have a width (i.e. extent perpendicular to the longitudinal axis of the aircraft) of 20 inches. The recess may have a depth (i.e. extent parallel to the longitudinal axis of the aircraft) of 7 inches.

The lavatory unit may comprise a sink, for example located adjacent an inboard and/or forward side of the unit It may be that the maximum length of the lavatory unit in the able-bodied configuration is no more than 38 inches.

The length of the unit may be defined as the distance the unit extends parallel to the longitudinal axis of the aircraft, e.g. the fore-aft extent of the unit. The width of the unit may be defined as the distance the unit extends perpendicular to the longitudinal axis of the aircraft, e.g. the inboard-outboard extent of the unit.

The height of the unit may be defined as the vertical extent of the unit.

The length and/or width of the unit may vary with height. For example the width of the unit may increase with height to a maximum before decreasing. The lavatory unit may have a first length in a lower region of the unit. The lavatory unit may have a second length in a middle region of the unit (for example if the forward side of the lavatory unit includes a seat-recess configured to receive the back of one or more seats in a row). The lavatory unit may have a third length in an upper region of the unit. The second length may be less than the first and/or third length. The second length may be the minimum length of the unit. The first and/or third length may be the maximum length of the unit. Such first, second and third lengths may be present, albeit with different values, in both the able-bodied configuration and the PRM-accessible configuration. In the able-bodied configuration, the maximum length may be no more than 38 inches, for example the maximum length may be approximately 38 inches. In the able-bodied configuration, the minimum length may be no more than 26 inches, for example the minimum length may be approximately 26 inches. It may be that the length of the unit increases by approximately 13 inches as the unit expands to the PRM-accessible configuration. For example, the moveable wall assembly may move aft by approximately 13 inches. In the PRM-accessible configuration, the maximum length may be no more than 51 inches, for example the maximum length may be approximately 51 inches. In the PRM-accessible configuration, the minimum length may be no more than 39 inches, for example the minimum length may be approximately 39 inches.

The lavatory unit may comprise one or more grab rails positioned to assist a PRM in transferring from a wheelchair onto the toilet.

The lavatory unit may comprise a baby-change table, for example a fold-down table, for example mounted to the outboard side of the lavatory unit, for example above the toilet.

The lavatory may comprise a sink. The sink may be fixed. The sink may be in the same location (for example fixed relative to a fixed wall) in both the able-bodied configuration and the PRM-accessible configuration.

In another aspect of the invention there is provided an aircraft including a lavatory unit in accordance with any other aspect.

The aircraft may comprise a cabin. The cabin may have passengers seats, for example one or more rows of three or more passenger seats, crew seats, one or more lavatory units in accordance with the present invention, one or more conventional lavatory units not in accordance with the present invention, aisles, galley space and/or other aircraft facilities located therein. Access to the cabin from the exterior of the aircraft may be provided by an aircraft door. The aircraft door may be configured to serve as an emergency exit in flight, for example may comprise one or more exit chutes for use by passengers in an emergency. The aircraft may be a narrow-body aircraft, for example a single-aisle aircraft. The aircraft may be a wide-body aircraft, for example a twin-aisle aircraft. The aircraft may be a commercial passenger aircraft, for example an aircraft configured to transport more than fifty passengers, for example more than one hundred passengers.

The lavatory unit may be located immediately aft or immediately forward of a row of seats, for example the rearmost or forward most row of seats on a side of the cabin. A side of the lavatory unit may comprise a recess shaped and configured to receive the backs of one or more seats in the row of seats. The lavatory unit may be located adjacent the cabin wall. The lavatory unit may be located between a row of seats and an aircraft door (in a direction parallel to the longitudinal axis of the aircraft). A second lavatory unit (a lavatory unit in accordance with the present invention or otherwise) may be located opposite the lavatory unit of the present invention, for example on the other side of the centreline of the aircraft. The lavatory unit, for example the aft or forward side and/or the door assembly, may be located immediately adjacent an egress pathway associated with an aircraft door. The egress pathway may be a portion of cabin floor space that must remain unobstructed during taxiing, take-off and landing for safety reasons. The lavatory unit may be located forward of a galley area, for example on the opposite side of the egress pathway to the galley area.

In the case that the aircraft cabin comprises a row of seats, an aircraft door, and an egress pathway associated with the aircraft door, it may be that the lavatory unit is located aft of the row of seats and immediately adjacent to the egress pathway.

In another aspect of the invention there is provided a method of reconfiguring an aircraft lavatory unit to enable access by a PRM. The method may comprise expanding the lavatory unit, for example from an able-bodied configuration to a PRM-accessible configuration, such that cabin floor space that was located outside the lavatory unit prior to the expansion is encompassed within the internal floor space of the lavatory unit after expansion.

In the case that the lavatory unit comprises a moveable wall assembly, the step of expanding the lavatory unit may comprise displacing the moveable wall assembly, for example rearwards.

The method may comprise an able-bodied user accessing the interior of the lavatory unit in the able-bodied configuration using a (primary) door. The method may comprise a PRM accessing the interior of the lavatory unit in the PRM-accessible configuration using the same (primary) door and, optionally, another, for example a secondary, door. The primary and secondary doors may form part of a door assembly.

The method may comprise reconfiguring, for example contracting, the lavatory unit, for example from the PRM-accessible configuration to the able-bodied configuration, such that cabin floor space that was encompassed within the internal floor space of the lavatory unit prior to the reconfiguration is located outside the lavatory unit after reconfiguration.

The method may comprise the lavatory unit being in the able-bodied configuration for taxing, take-off and landing. The method may comprise the lavatory unit being reconfigured while the aircraft is in flight.

In another aspect of the invention there is provided a sink for an aircraft lavatory unit, for example a lavatory unit in accordance with any other aspect. The sink comprises a basin. The sink comprises a faucet located above the basin such that water from the faucet can flow into the basin under the action of gravity. In view of the space constraints in aircraft toilets it is advantageous for the basin to be relatively narrow. However this may lead to excessive splashing when a user tries to wash their hands. The Applicant has recognized that the amount of splashing will be reduced if the basin is relatively deep and/or the faucet is located relatively close to the top of the basin. In particular, the Applicant has recognized that splashing may be reduced if a user can insert the majority of, for example substantially all of their hand vertically into the basin. Accordingly, in one aspect of the invention there is provided a sink comprising a basin, the basin having a length, a width and a depth (i.e. vertical extent), the width being very much less than the length. The depth of the basin may be at least 7 inches, for example at least 8 inches. A companion document to NASA-STD-3001 Volume 2 is the Human Integration Design Handbook (HIDH). HIDH Revision 1—Jun. 5, 2014, NASA/SP-2010-3407/REV1, is available at https://www.nasa.gov/sites/default/files/atoms/files/
human_integration_design_handbook_revision_1.pdf (accessed 22 Aug. 2019) and gives the maximum length of a hand as 8.7 inches or 22.1 cm, see p 1168. The width of the basin may be no more than 6 inches, for example no more than 5 inches. The faucet may be located no more than 3 inches, for example no more than two inches above the top of the basin.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 8(a) to (d) shows different stages in a process of an unassisted PRM using the lavatory unit of the first example embodiment;

FIG. 9(a) to (d) shows different stages in a process of a PRM using the lavatory unit of the first example embodiment with the aid of an assistant;

DETAILED DESCRIPTION

Figure 1:
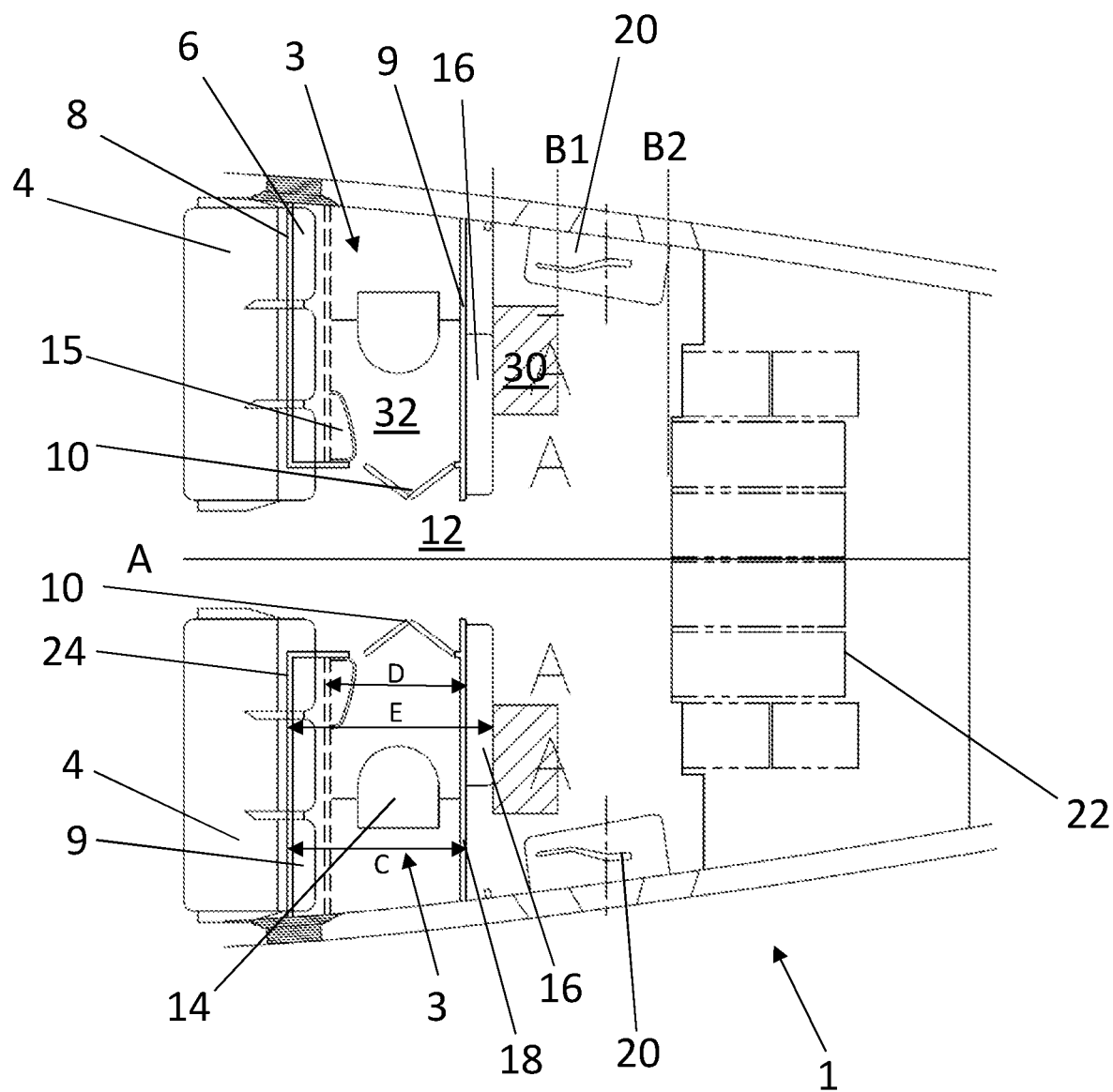
FIG. 1 shows a cabin layout including a prior art lavatory unit.

FIG. 1 shows the layout of an aircraft cabin 1 including two prior-art lavatory units 3. The cabin 1 layout is essentially symmetrical about a centreline of the aircraft, labelled A in FIG. 1. Either side of the centreline A is a row of three forward-facing passenger seats 4 (the seats facing towards the left-hand side in FIG. 1). A lavatory unit 3 is located to the rear of each row of seats 4, with the back of the seats 4 received within a recess 6 formed in the forward side 8 of the perimeter wall 9 that separates the interior of lavatory unit 3 from the cabin 1. A bi-fold door 10 of each lavatory unit 3 opens onto an aisle 12 which runs along the centreline A of the aircraft and between the seats 4. A toilet 14 and a sink 15 are located within the lavatory unit 3, toilet 14 is located opposite the bi-fold door 10 and sink 15 is located in the corner between the forward side 8 and an inboard side 24 of the perimeter wall 9 (the inboard side 24 being the side facing aisle 12). A double crew-seat 16 is mounted to the rear side 18 of each lavatory unit 3. An exit 20 is located on both sides of the cabin 1, aft of the lavatory units 3. Vertical lines B1, B2 added to the upper half of FIG. 1 along with the shaded area of cabin floor space 30 immediately adjacent the forward line B1 denote the limits of an egress pathway that must remain unobstructed during taxiing, take-off and landing. A similar pathway exists on the other side of the cabin 1. The shaded area of cabin floor space 30 is immediately adjacent the rear side of the crew seat 16, when the seat is in the folded configuration. The rearward line B2 is immediately adjacent the forward extent of a galley area 22 which extends across the rear of the cabin 1 (the right hand side of the cabin in FIG. 1). The length of the lavatory unit 3 (i.e. the extent of the lavatory unit 3 measured parallel to the centreline A) is 33 inches at its longest point (labelled C in FIG. 1) and 26 inches at its shortest point (labelled D in FIG. 1), the difference being due to recess 6. The length of the lavatory unit 3 including crew seat 16 (labelled E in FIG. 1) is 38 inches.

In use, an able-bodied user can access lavatory unit 3 from aisle 12 via bi-fold door 10 to use toilet 14 and sink 15.

The space efficient nature of prior-art lavatory unit 3 facilitates its incorporation into the cabin. However, due to its dimensions and layout, lavatory unit 3 tends not to be PRM-accessible.

Figure 2A:
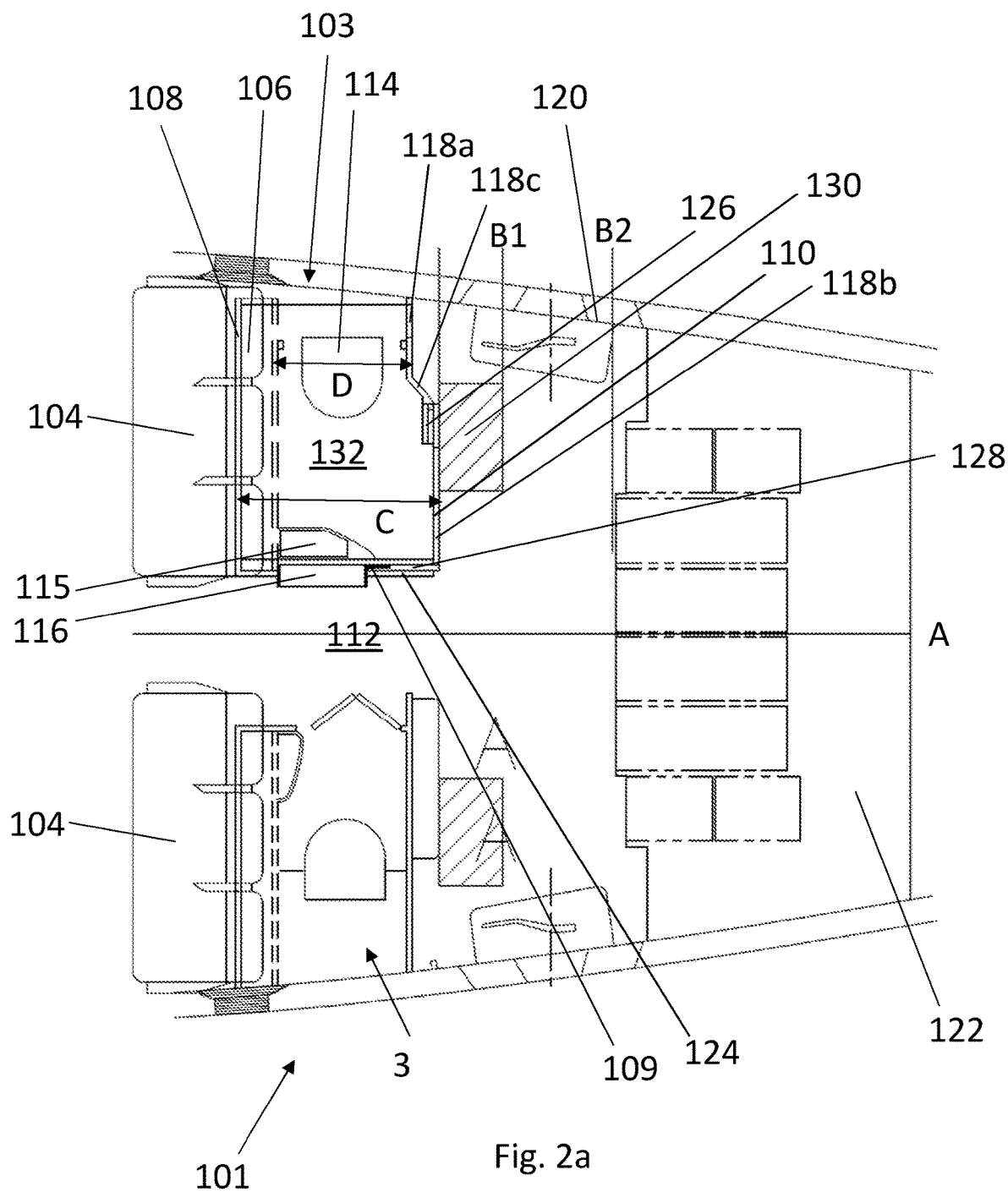
FIGS. 2a and 2b show a cabin layout including a lavatory unit according to a first example embodiment of the invention, when the lavatory unit is in (a) an able-bodied configuration and (b) a PRM-accessible configuration.
Figure 2B:
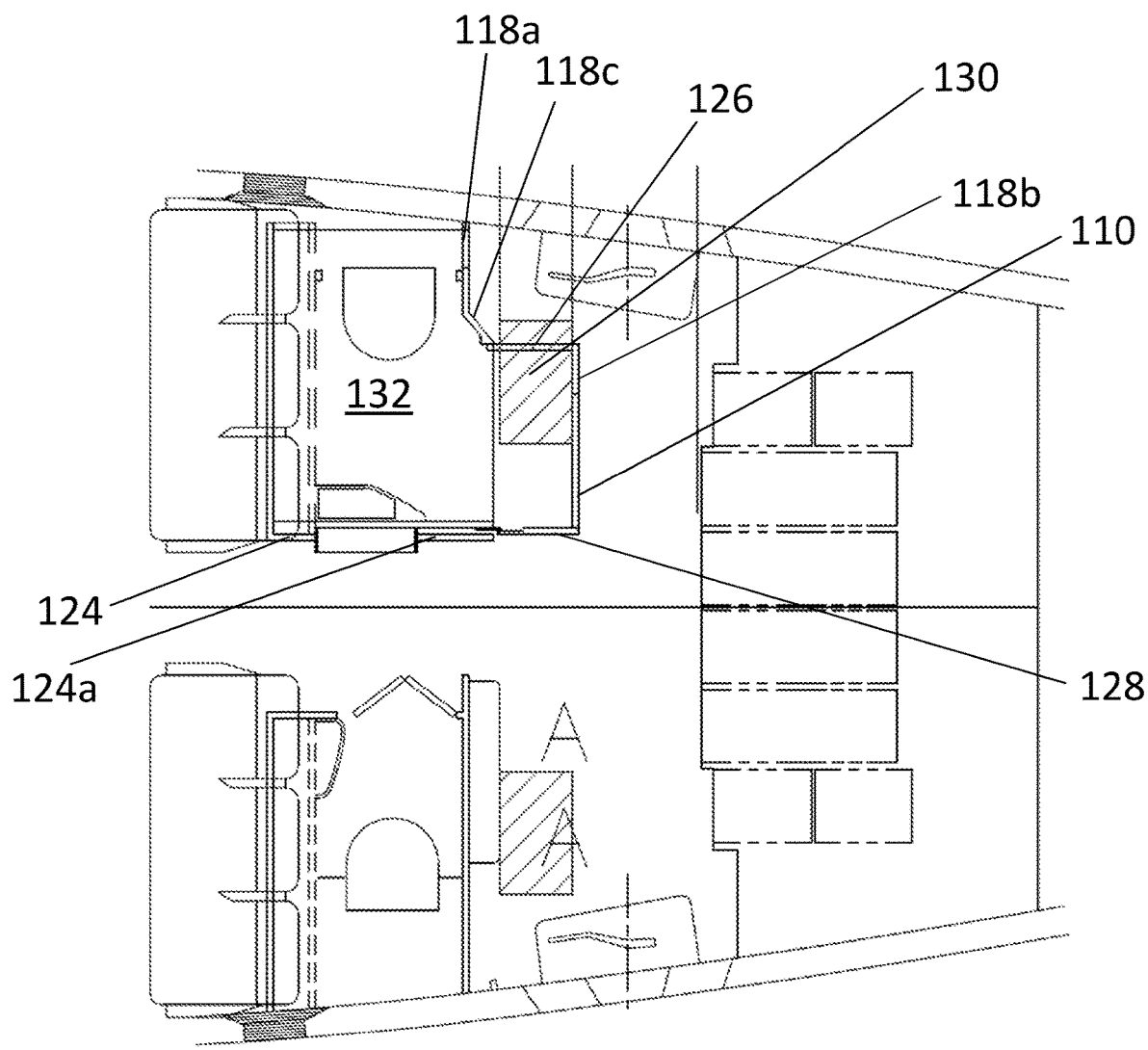
Figure 3A:
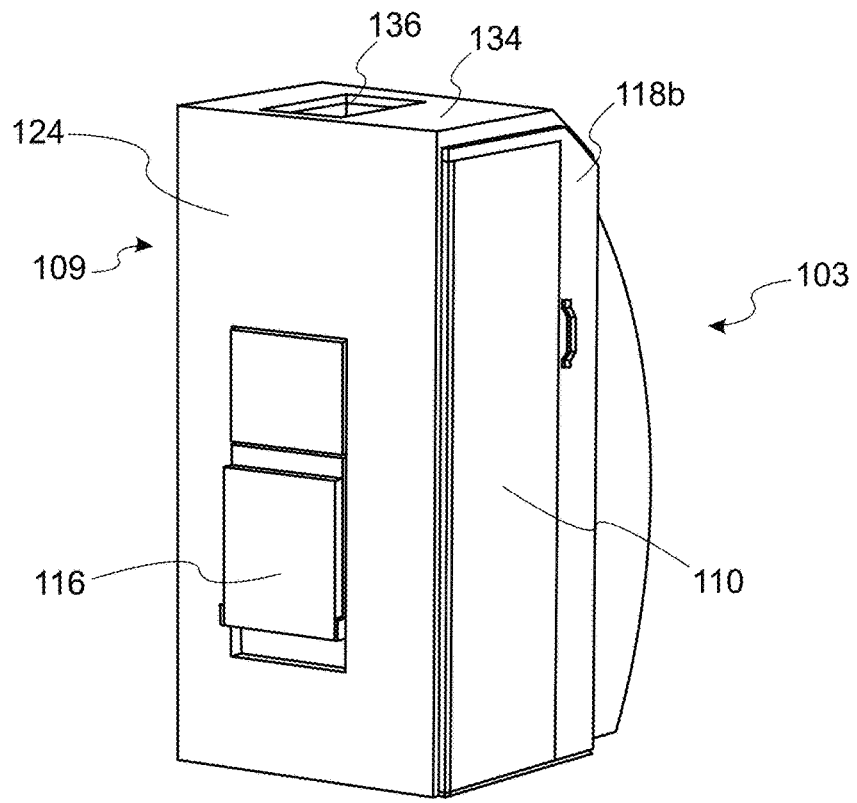
FIGS. 3a to 3d show a perspective view from (a) the inboard side, (b) the aft side, (c) the outboard side and (d) the forward side of the lavatory unit of the first example embodiment.
Figure 3B:
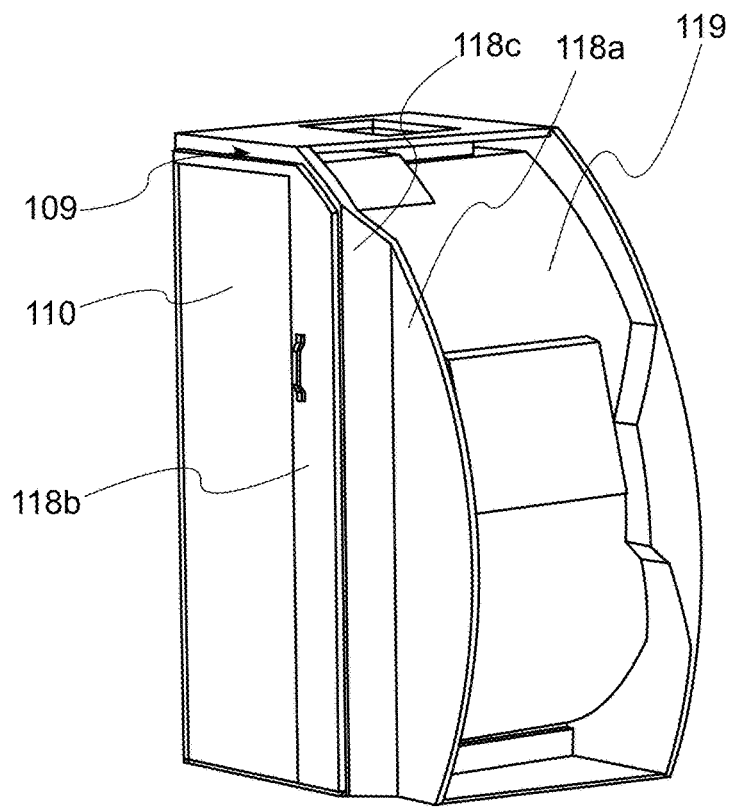
Figure 3C:
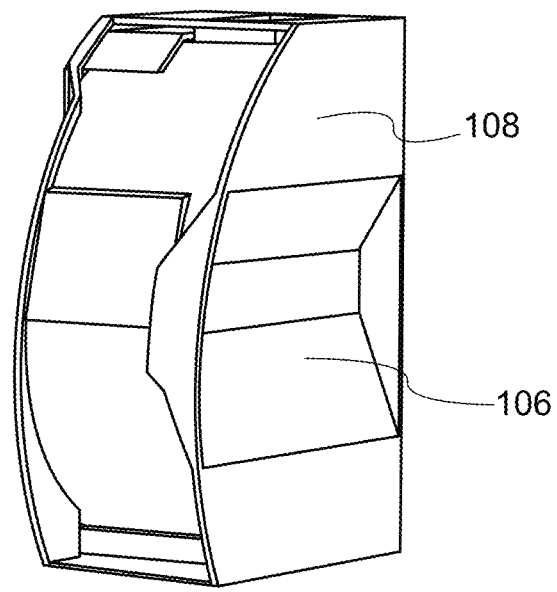
Figure 3D:
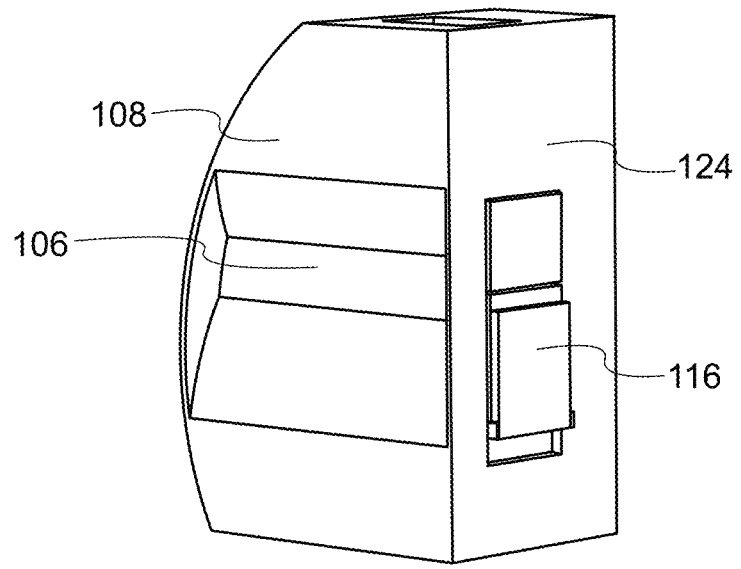

FIGS. 2(a) and (b) show the layout of an aircraft cabin 101 including a lavatory unit 103 in accordance with a first embodiment of the invention. Elements that are similar as between FIGS. 1 and 2 have been indicated in FIG. 2 using their reference numeral from FIG. 1 incremented by 100 (i.e. lavatory unit 3 in the FIG. 1 is referred to as lavatory unit 103 in FIG. 2). The position of passenger seats 104, aisle 112, exits 120, lines B1, B2 and galley 122 is essentially unchanged as between FIGS. 1 and 2. A lavatory unit 103 in accordance with a first example embodiment is shown in the top half of the cabin as shown in FIG. 2, the bottom half of the cabin including a prior-art lavatory unit 3 as described above in FIG. 1. In other embodiments, two lavatory units in accordance with the first example embodiment may be used. The lower half of the cabin as shown in FIG. 2 is essentially unchanged from that shown in FIG. 1. The lavatory unit 103 is located to the rear of each row of seats 104, with the back of the seats 104 received within a recess 106 formed in the forward side 108 of the perimeter wall 109 of the lavatory unit 103. The position of recess 106 and forward side 108 is unchanged as between FIG. 1 and FIG. 2. In contrast to the prior-art lavatory unit 3, a single crew seat 116 is located on an inboard side 124 of lavatory unit 103 (i.e. the side facing aisle 112) and door 110 is located in the aft side 118 of perimeter wall 109. A toilet 114 and a sink 115 are located in lavatory unit 103, the sink 115 is located in the corner between inboard side 124 and forward side 108 of perimeter wall 109, the toilet 114 is opposite to and faces inboard side 124. The position of the toilet 114 and sink 115 remains unchanged as between FIG. 2(a) and FIG. 2(b). In other embodiments, lavatory unit 103 may be located in a different region of the cabin, for example forward of an aircraft door, or in the centre of the cabin.

In FIG. 2(a) and FIGS. 3(a) to 3(d), the lavatory unit 103 is in an able-bodied configuration. An outboard portion 118a of aft side 118 of perimeter wall 109 (i.e. the portion furthest from aisle 112 in FIG. 2) is in the same position relative to seats 104 as in FIG. 1, but an inboard portion 118b of aft side 118 which includes door 110 is immediately adjacent line B1 (see FIG. 2(a)). An intermediate portion 118c of side 118 joins the outboard 118a and inboard 118b portions. A bi-fold panel 126 is connected between inboard portion 118b and intermediate portion 118c of aft side 118. In the able-bodied configuration this panel is located inside lavatory unit 103 and is folded. A sliding panel 128 is mounted on a fixed portion 124a of the inboard side 124 of perimeter wall 109.

In the able-bodied configuration the sliding panel 128 is located within the fixed portion 124a of the inboard side 124. In some embodiments, the length of the lavatory unit 103 (i.e. the extent of the lavatory unit 103 measured parallel to the centreline A) is 38 inches at its longest point (labelled C in FIG. 2a) and 26 inches at its shortest point (labelled D in FIG. 2a), when the lavatory unit is in the able-bodied configuration. Thus, the length of the lavatory unit 103 in the able-bodied configuration is equal to the length of the known lavatory unit 3 including crew seat 16 (labelled E in FIG. 1).

In the PRM-accessible configuration shown in FIG. 2(b) the inboard portion 118b of the aft side 118 of the perimeter wall 109 is displaced rearwards (towards the right-hand side in FIG. 2(b)) in comparison to its position in the able-bodied configuration of FIG. 2(a). In some embodiments, the inboard portion 118b is displaced rearwards by 13 inches as between the able-bodied and PRM-accessible configurations. The position of intermediate portion 118c remains unchanged as between FIG. 2(a) and FIG. 2(b). In FIG. 2(b), bi-fold panel 126 is unfolded and extends along a straight line parallel to centreline A between intermediate portion 118c and inboard portion 118b of aft side 118. Thus, in the PRM-accessible configuration, aft side 118 includes inboard portion 118b, outboard portion 118a, intermediate portion 118c and bi-fold panel 126. In FIG. 2(b) sliding panel 128 has slid rearwards out of stationary portion 124a of inboard side 124 and extends between stationary portion 124a and inboard portion 118b of aft side 118. Thus, in the PRM-accessible configuration, inboard side 124 includes stationary portion 124a and sliding panel 128.

It will be appreciated by comparing FIGS. 2a and 2b, and in light of the description above that a portion of cabin floor space 130 that is outside the lavatory unit 103 when the lavatory unit 103 is in the able-bodied configuration of FIG. 2(a) is encompassed within the internal floor space 132 of the lavatory unit 103 when the lavatory unit is in the PRM-accessible configuration of FIG. 2(b).

It will also be appreciated that the positioning of the inboard portion 118b of aft side 118 is made possible because crew seat 116 is located on the inboard side 124 of the lavatory unit 103 rather than on the aft side as in lavatory unit 3. Consequently, the length of the lavatory unit 103 in the able-bodied configuration may be increased to make use of the space vacated by the crew seat.

FIG. 3 shows perspective views of the lavatory unit 103 of the first example embodiment from the (a) inboard, (b) aft, (c) outboard and (d) forward sides. In FIG. 3 the lavatory unit 103 is in the able-bodied configuration with the door 110 closed. As can be seen in FIGS. 3(a) and (b), perimeter wall 109 includes a top side 134 having an opening 136 for a PSU (Passenger Service Unit) formed therein. Recess 106 is shown in more detail in FIGS. 3(c) and (d). The recess 106 is positioned vertically so as to receive the seat backs of the passenger seats of row 104. The recess 106 does not extend all the way down to the cabin floor and accordingly the lavatory unit 103 has an increased length below the height of the recess 106. Inside the lavatory unit 103 this provides a knee-receiving recess 138 (see FIG. 7) shaped and configured to receive the knees of a PRM in a wheelchair. In other embodiments the recess may be absent. As can be seen in FIG. 3(b) the outboard side 119 of the lavatory unit 103 is curved to match the shape of the cabin wall.

Figure 4:
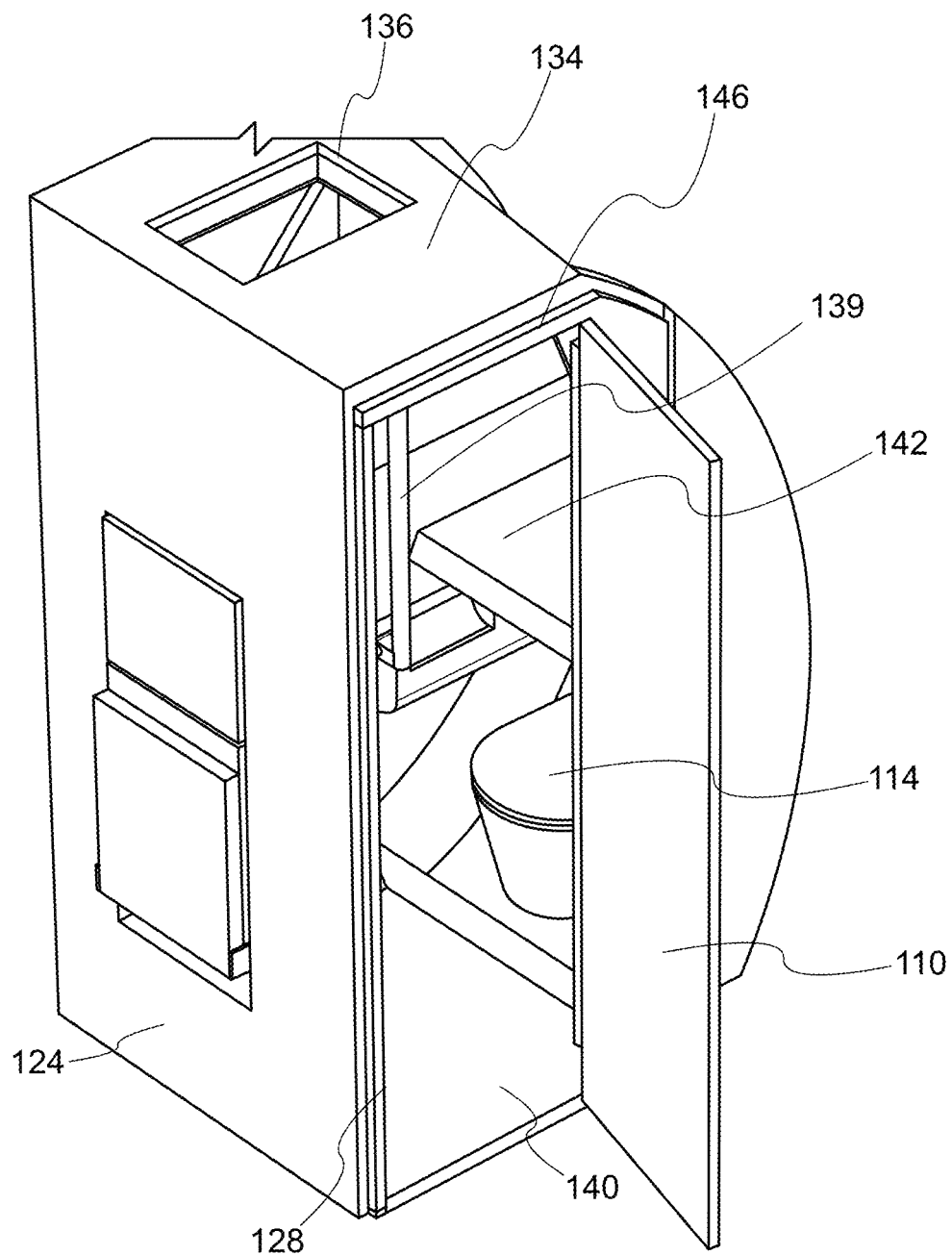
FIG. 4 shows a perspective view of the lavatory unit of the first example embodiment in an able-bodied configuration with the door open.

FIG. 4 shows a perspective view of the lavatory unit 103 of the first example embodiment in the able-bodied configuration with the door 110 open to allow an able-bodied user to access the interior of the lavatory unit 103 via a door opening 140. A baby changing table 142 is provided above the toilet 114 and is shown in the down position in FIG. 4 (but can be folded upwards and stowed when the toilet 114 is to be used). Grab handles 139 are positioned either side of toilet 114 (see FIG. 6). Sliding panel 128 protrudes rearwardly from fixed part 124a of inboard side 124, and includes a latch (not shown) in its rearward end to which door 110 latches when closed.

Figure 5A:
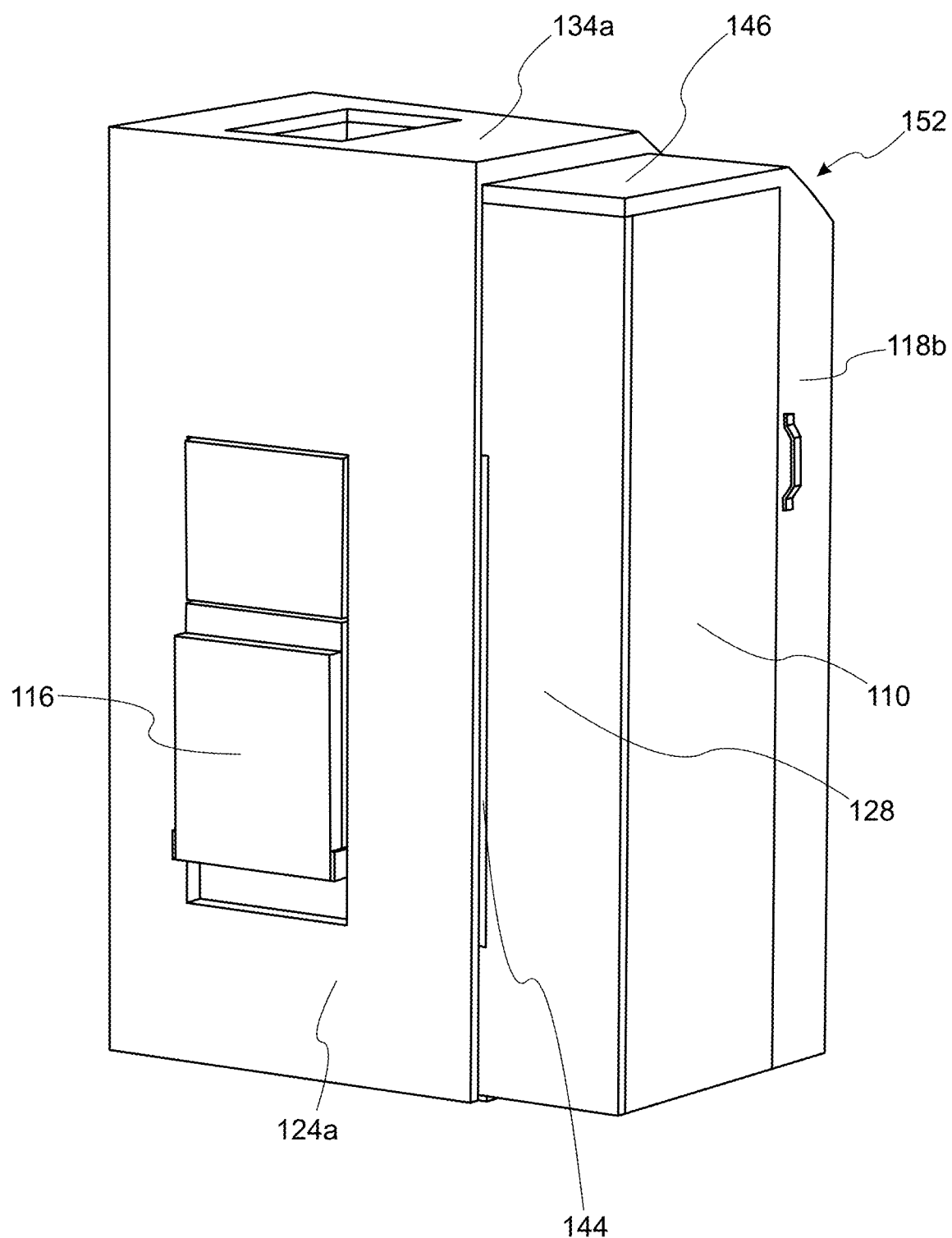
FIGS. 5a and 5b are perspective views of the lavatory unit of the first example embodiment in a PRM-accessible configuration with (a) the door closed and (b) the door open.
Figure 5B:
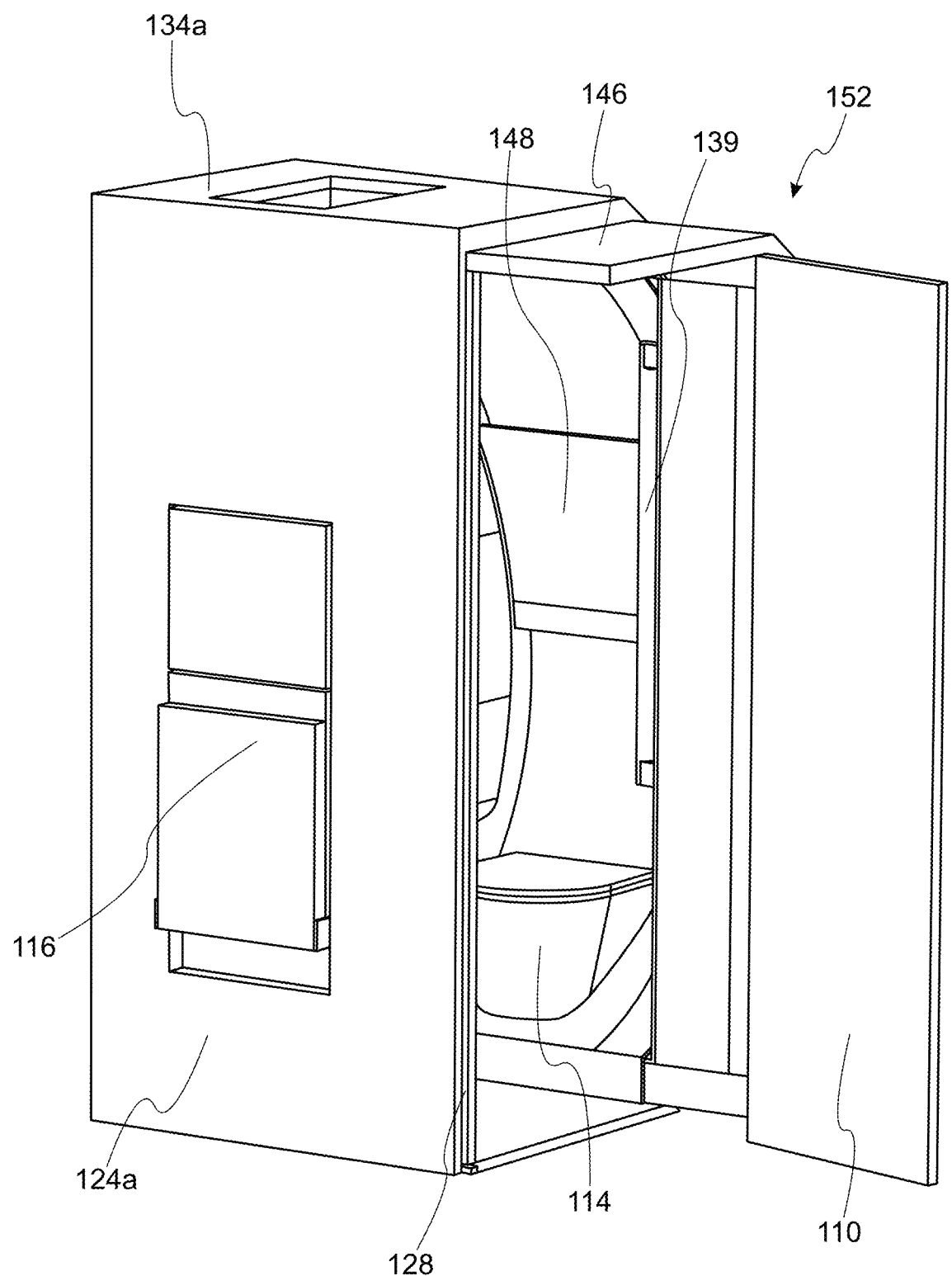

FIGS. 5a and 5b show a perspective a view of the lavatory unit 103 of the first example embodiment in the PRM-accessible configuration. As can be seen in FIG. 5, in the PRM-accessible configuration, the top side 134 of lavatory unit 103 includes a ceiling panel 146 that extends between a fixed part 134a of the top side 134 and inboard portion 118b of the aft side 118. Ceiling panel 146 is a sliding panel that is located within the fixed part 134a of the top side 134 of the perimeter wall 109 when the lavatory unit 103 is in the able-bodied configuration. In the PRM-accessible configuration, the inboard-side 124 further includes an insert panel 144 (shown in more detail in FIG. 6) extending between fixed part 124a of inboard side 124 and sliding panel 128 over a portion of the height of the unit 103. In other embodiments the insert panel may be absent. Together, inboard portion 118b of aft side 118 (including door 110), bi-fold panel 126, sliding panel 128, ceiling panel 146 and insert panel 144 may be referred to as a moveable wall assembly 152. In some embodiments the moveable wall assembly 152 may comprise additional elements, for example further panels. In the same or yet further embodiments, moveable wall assembly 152 does not include door 110. In the same or yet further embodiments, the moveable wall assembly 152 may comprise elements from other sides of the perimeter wall 109. For example, the moveable wall assembly 152 may comprise parts of any one of the inboard, outboard, forward and/or aft sides of the lavatory units. In FIG. 5(a) the inboard edge of door 110 is latched to the rearward end of sliding panel 128 and the lavatory unit 103 is therefore closed off from the cabin 1. It will be appreciated that other latching arrangements may be used.

In FIG. 5(b) door 110 is pivoted about a hinged connection to the rest of the inboard portion 118b of aft side 118, and sliding panel 128 is slid back into the fixed portion 124a of the inboard side 124 thereby creating an opening 148 via which a PRM can access the interior of the lavatory unit 103. Opening 148 is bigger than opening 140 (i.e. bigger than the door opening in the able-bodied configuration).

Figure 6A:
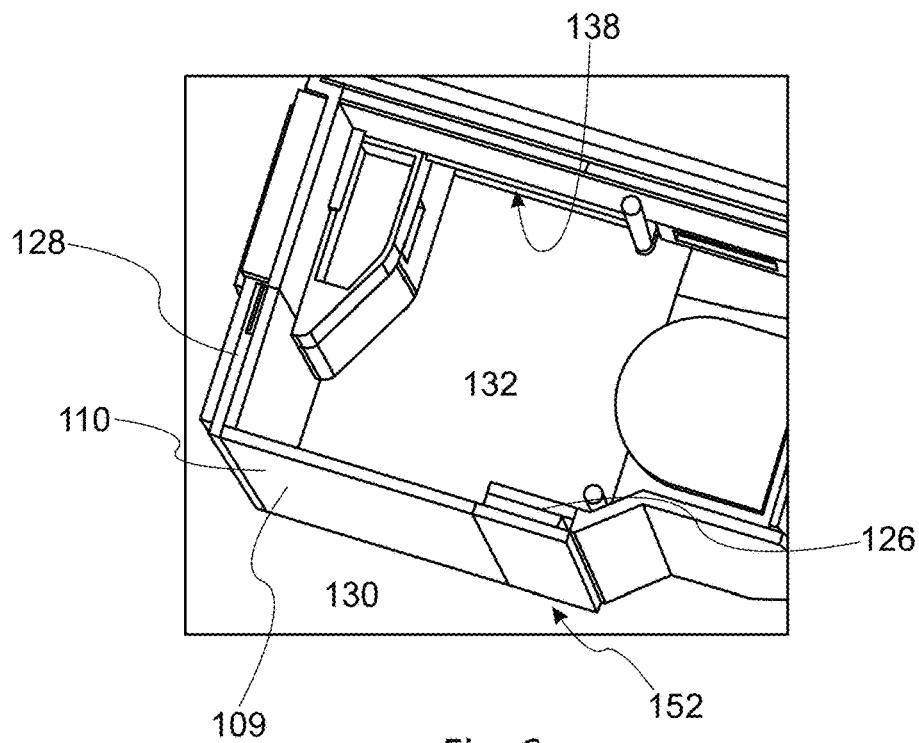
FIGS. 6a to 6c show a plan view of the lavatory unit of the first example embodiment in (a) an able-bodied configuration, (b) an intermediate configuration and (c) a PRM-accessible configuration.
Figure 6B:
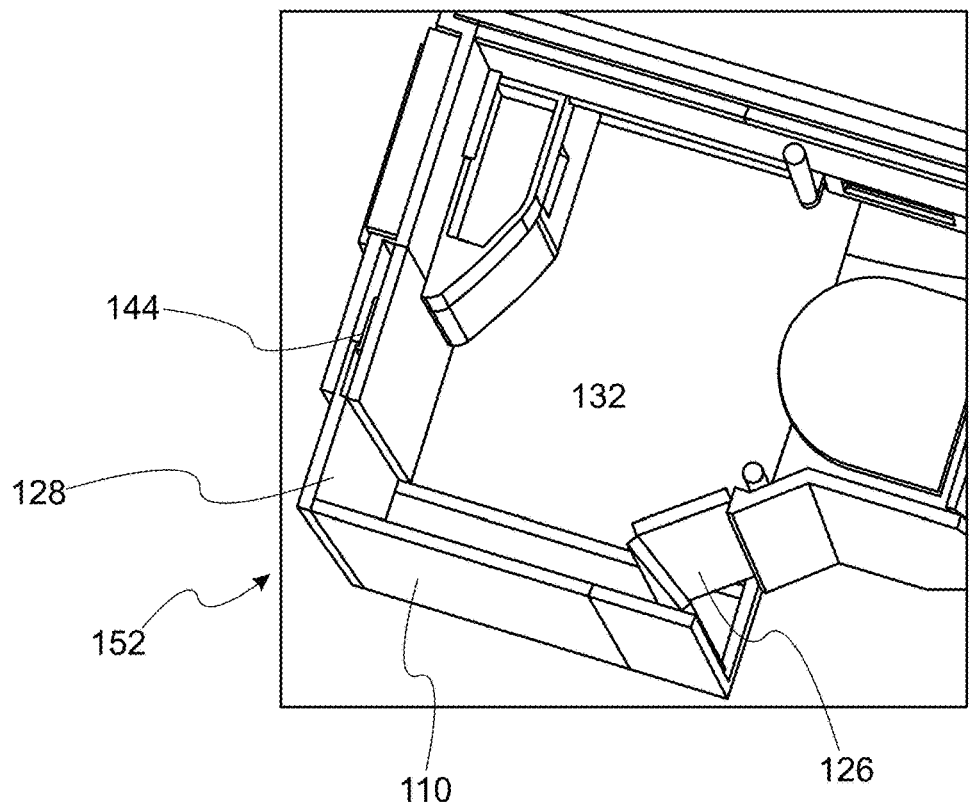
Figure 6C:
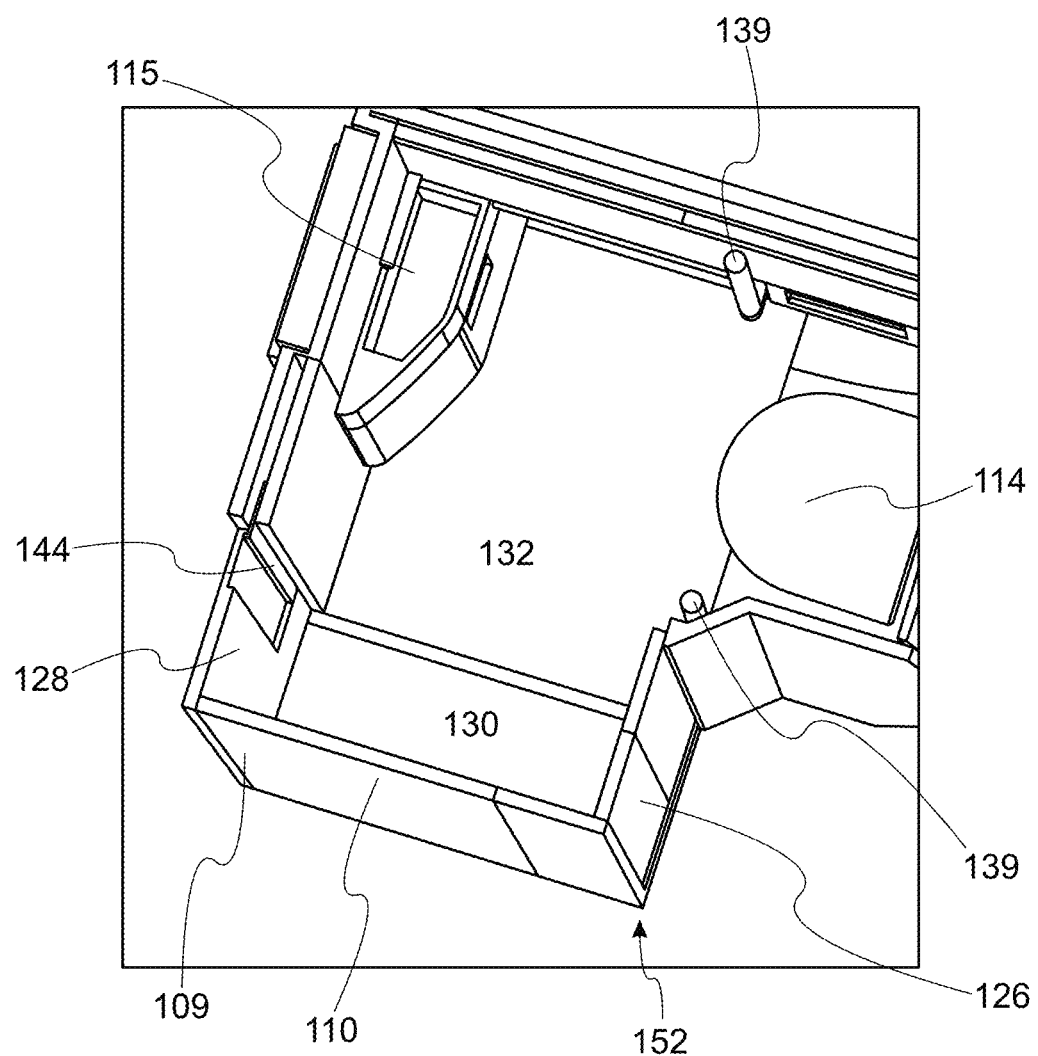

FIG. 6 shows a sectional plan view of the lavatory unit 103 of the first example embodiment in (a) the able-bodied configuration, (b) and intermediate configuration and (c) the PRM-accessible configuration. In FIG. 6(a), the portion of cabin floor space 130 is shown on the other side of the door 110 (which forms part of perimeter wall 109) to the internal floor space 132 of the lavatory unit 103 and is therefore external to the lavatory unit. In FIG. 6(c) that portion of cabin floor space 130 is now within the perimeter wall 109 defined by sliding panel 128, door 110 and aft wall 118 and therefore is encompassed within the internal floor space 132.

Figure 7:
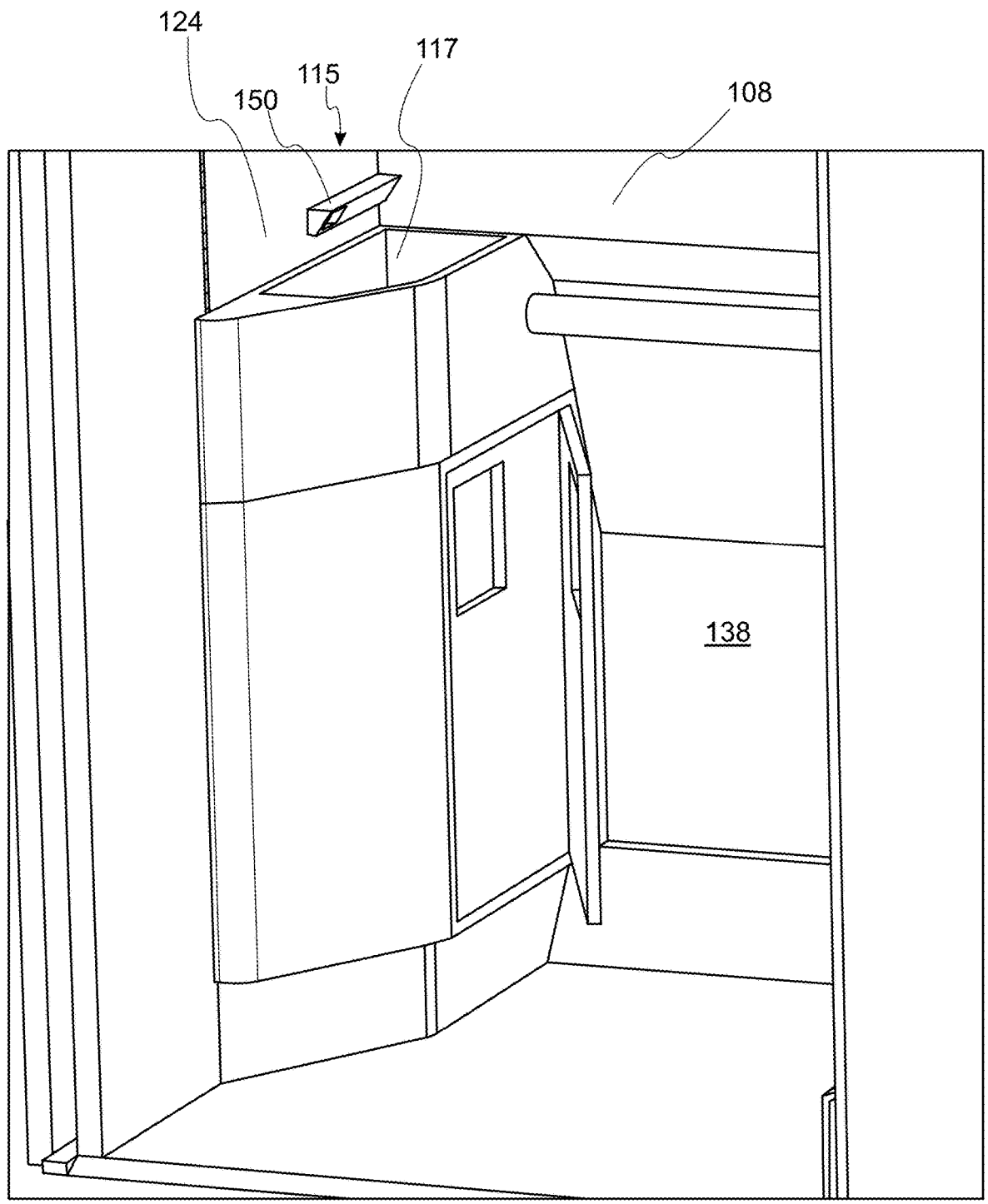
FIG. 7 shows a perspective view of part of the interior of the lavatory unit of the first example embodiment.

FIG. 7 shows a close up of the interior of the lavatory unit 103 and in particular, sink 115. As can be seen in FIG. 7, sink 115 extends further along inboard side 124 than forward side 108 and comprises a basin 117. The basin 117 is relatively narrow and relatively deep such that a user's hand may be received in the basin 117 vertically. A faucet 150 is located above the sink 115 and is relatively close to the top of the basin 117. In some embodiments the faucet 150 may be within 2 inches of the top of the sink. In some embodiments, the basin 117 may have a depth of 8 inches and a width of 5 inches. While the sink 115 is described here in the context of accessible lavatory unit 103, it will be appreciated that the use of such a sink is not restricted to such lavatory units and sink 115 may find application in aircraft lavatory units of various types.

For take-off, taxiing and landing, lavatory unit 103 is in the able-bodied configuration. When a PRM needs to access the lavatory unit 103 a member of the cabin crew reconfigures the lavatory unit 103 from the able-bodied configuration to the PRM-accessible configuration by moving the inboard end 118b of the aft side 118 rearwards. By virtue of their connection therewith, bi-fold panel 126, sliding panel 128 and ceiling panel 146 slide and/or unfold with the motion of the inboard end 118 to move from their positions in the able-bodied configuration to their positions in the PRM-accessible configuration thereby covering gaps that would otherwise be created in the perimeter wall 109 by the movement of the inboard end 118b of the aft side 118 relative to other elements of the perimeter wall 109. Similarly, insert panel 144 is located in a gap that remains in the perimeter wall 109 after the elements discussed above have reached their positions in the PRM-accessible configuration. The expansion of the lavatory unit 103 using the moveable wall assembly 152 causes a portion of the cabin floor space 130 that was outside the lavatory unit 103 in the able-bodied configuration to be brought within the lavatory unit 103 thereby increasing the internal floor space 132 of the unit 103. A PRM enters the unit 103 via opening 148 which is created by moving door 110 to an open position and sliding slidable panel 128 back into the perimeter wall 109 thereby rendering opening 148 larger in comparison to opening 140 of the able-bodied configuration. The increase in the internal floor space 132 and the size of the opening 148 provides sufficient room to allow a PRM in a wheelchair to enter the lavatory unit 103 in a way which allows them to transfer to the toilet 114 when the door 110 and sliding panel 128 are closed together. Accordingly, lavatory units in accordance with the present example embodiment provided a PRM-accessible lavatory unit that, in the able-bodied configuration has the same footprint as the prior-art non-accessible lavatory unit but which can be reconfigured to be PRM-accessible. Additionally, the process of reconfiguring the lavatory unit between the able-bodied and PRM-accessible configurations is more user friendly and straightforward for cabin crew in comparison to prior art accessible toilets and does not require occupation of additional toilets. In the present embodiment, accessibility in the PRM-accessible configuration is achieved by the combination of the two-part door (i.e. door 110 and sliding panel 128) and the moveable wall assembly 152. However, it will be appreciated that, depending on the shape and configuration of the lavatory unit it may not always be necessary to have these two features together to produce an accessible toilet. Accordingly, these features may find application separately.

It will be appreciated that various service connections (not shown) will join the lavatory unit to various aircraft systems including electric power etc.

FIG. 8 shows different stages in a process of an unassisted PRM using the lavatory unit of the first example embodiment. In FIG. 8(a) the PRM is seated in the aircraft wheelchair and enters the lavatory unit 103 facing forward via opening 148. The PRM moves forward within the lavatory unit 103 and the door 110 and slidable panel 128 are brought together to close off the lavatory unit 103 from the cabin as shown in FIG. 8(b). The PRM can then transfer themselves from the wheelchair to the toilet 114 via the position shown in FIG. 8(c) to a final position shown in FIG. 8(d). As the PRM transfers from the wheelchair to the toilet 114 their knees enter recess 138. Toilet 114 is shaped to allow a user to facing the inboard/forward corner of the lavatory unit with their knees located in recess 138 (as shown in FIG. 8(d)).

FIG. 9 shows different stages in a process of a PRM using the lavatory unit of the first embodiment with the aid of an assistant. In FIG. 9(a) the PRM is seated in the aircraft wheelchair and enters the lavatory unit 103 facing rearward via opening 148. The PRM moves forward within the lavatory unit 103 until both the PRM and the assistant are inside lavatory unit 103 and the door 110 and slidable panel 128 are brought together to close off the lavatory unit 103 from the cabin as shown in FIG. 9(b). The PRM can then transfer with the aid of the assistant from the wheelchair to the toilet 114 via the position shown in FIG. 9(c) to a final position shown in FIG. 9(d). Toilet 114 is shaped to allow a user to facing the inboard/aft corner of the lavatory unit (as shown in FIG. 9(d)). While inside the lavatory unit 103 the assistant stands with their back to door 110 within the space created by moveable wall assembly 152.

Figure 10A:
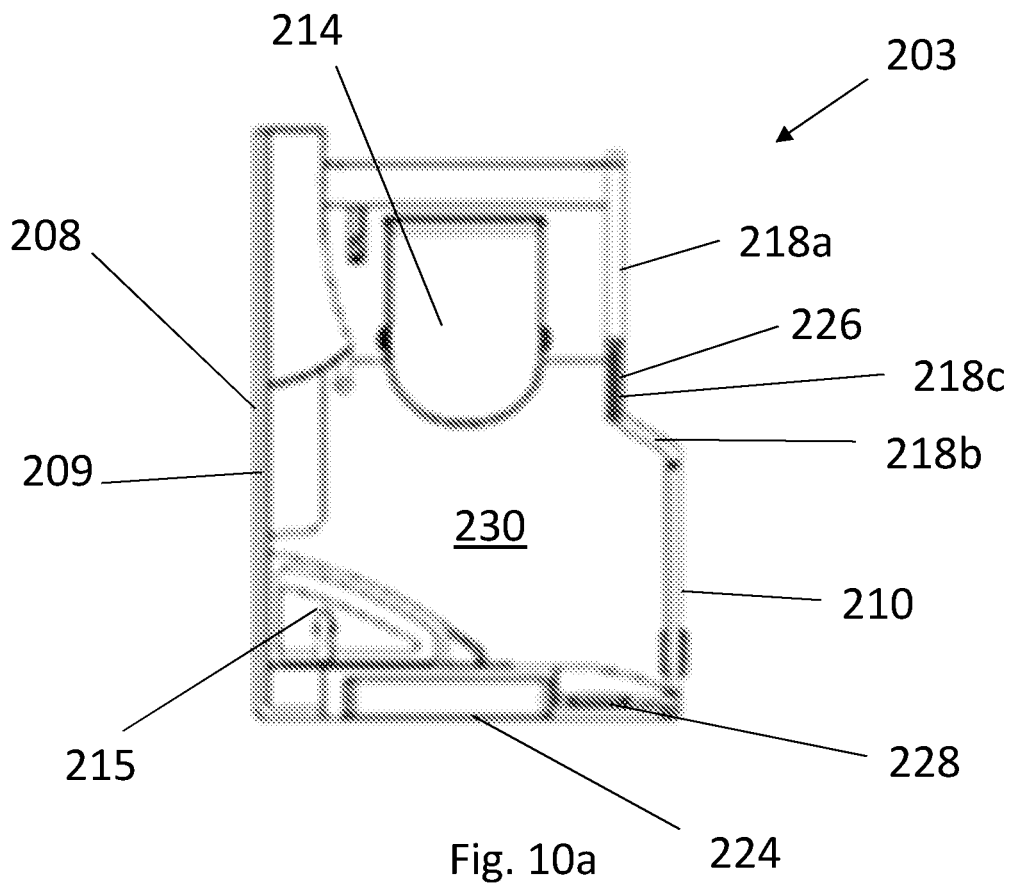
FIG. 10(a) to (e) show different stages in a process of a PRM using a lavatory unit of a second example embodiment with the aid of an assistant; and, FIG. 11 shows a flow chart of a method of using the lavatory unit of the first example embodiment.
Figure 10B:
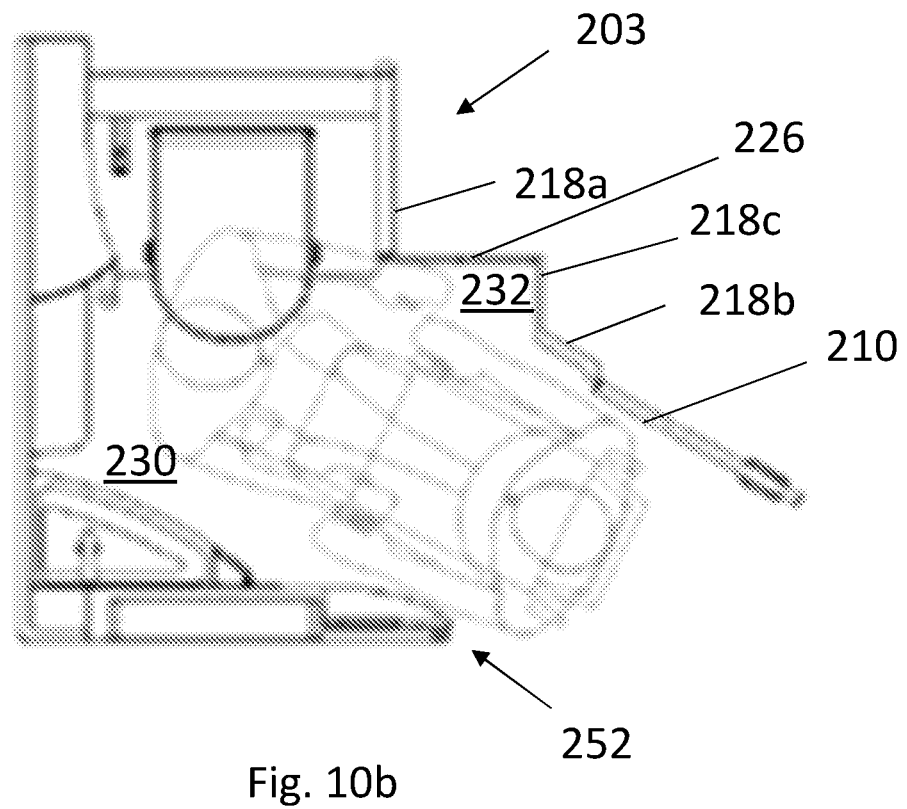
Figure 10:
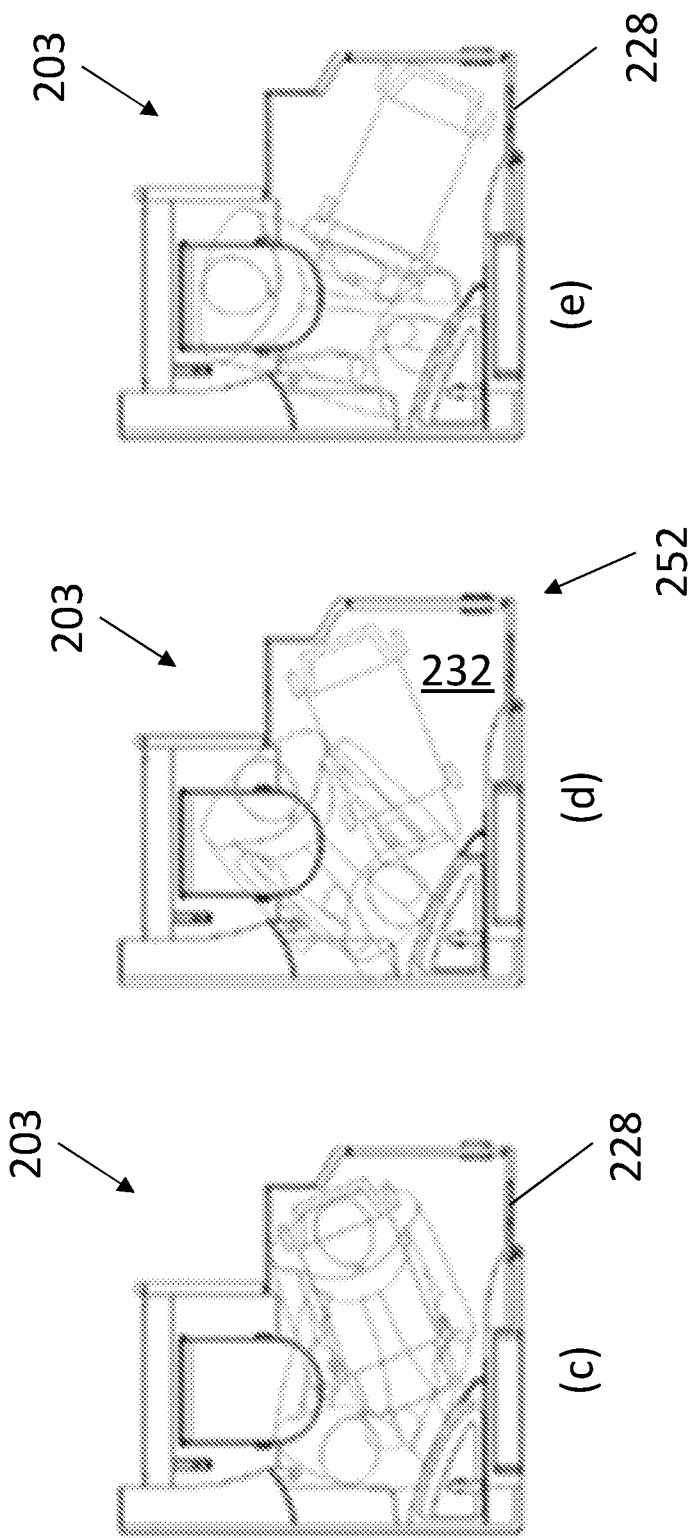

FIG. 10 shows different stages in a process of a PRM using a lavatory unit of a second embodiment with the aid of an assistant. Elements that are similar as between FIGS. 2 and 10 have been indicated in FIG. 10 using their reference numeral from FIG. 2 incremented by 100 (i.e. lavatory unit 103 in FIG. 2 is referred to as lavatory unit 203 in FIG. 10). The aspects of the lavatory unit 203 of FIG. 10 that differ significantly with respect to the lavatory unit 103 of FIG. 2 will be discussed here, other aspects of the lavatory unit 203 being substantially as described for lavatory unit 103. In FIG. 10(a) the lavatory unit 203 is in the able bodied configuration and, when viewed in plan, appears substantially similar to the lavatory unit 103 of FIG. 2, with the exception that the lavatory unit 203 does not include a crew seat. In the lavatory unit 203 of FIG. 10, a bi-fold panel 226 is connected between an outboard portion 218a and intermediate portion 218c of aft side 218 of perimeter wall 209 (rather than between inboard portion 118b and intermediate portion 118c). In the able-bodied configuration this panel is located inside lavatory unit 203 and is folded. In contrast to the lavatory unit of FIG. 2, the lavatory unit 203 does not include a sliding panel or a recess equivalent to recess 106. The location and orientation of lavatory unit 203 within the aircraft cabin is the same as for lavatory unit 103 in FIG. 2, but in other embodiments the orientation and/or location may differ. In the PRM-accessible configuration shown in FIG. 10(b) the inboard portion 218b and the intermediate portion 218c of perimeter wall 209 is displaced rearwards (towards the right-hand side in FIG. 10(b)) in comparison to its position in the able-bodied configuration of FIG. 10(a). In FIG. 10(b), bi-fold panel 226 is unfolded and extends along a straight line parallel to centreline A between intermediate portion 218c and outboard portion 218a of aft side 218. Thus, in the PRM-accessible configuration, aft side 218 includes inboard portion 218b, outboard portion 218a, intermediate portion 218c and bi-fold panel 226.

It will also be appreciated that the positioning of the inboard portion 118b and intermediate portion 218c of aft side 218 is made possible because the crew seat is absent from the aft side 218. Consequently, the length of the lavatory unit 203 in the PRM configuration may be increased to make use of the space vacated by the crew seat.

For take-off, taxiing and landing, lavatory unit 203 is in the able-bodied configuration shown in FIG. 10(a). When a PRM needs to access the lavatory unit 203 a member of the cabin crew reconfigures the lavatory unit 203 from the able-bodied configuration to the PRM-accessible configuration shown in FIG. 10(b) to (e) by moving the inboard end 218b and intermediate portion 218c of the aft side 218 rearwards. By virtue of their connection therewith, bi-fold panel 226, sliding panel (not shown) and ceiling panel (not shown) slide and/or unfold with the motion of the inboard end 218 to move from their positions in the able-bodied configuration to their positions in the PRM-accessible configuration thereby covering gaps that would otherwise be created in the perimeter wall 209 by the movement of the inboard end 218b and intermediate portion 218c relative to other elements of the perimeter wall 209. The expansion of the lavatory unit 203 using the moveable wall assembly 252 causes a portion of the cabin floor space 230 that was outside the lavatory unit 203 in the able-bodied configuration to be brought within the lavatory unit 203 thereby increasing the internal floor space 232 of the unit 203. A PRM enters the unit 203 via the opening which is created by moving door 210 to an open position and sliding slidable panel 228 back into the perimeter wall 209 thereby rendering the opening in the PRM-accessible configuration larger in comparison to the opening of the able-bodied configuration. The increase in the internal floor space 232 and the size of the opening provides sufficient room to allow a PRM in a wheelchair to enter the lavatory unit 203 in a way which allows them to transfer to the toilet 214 when the door 210 and sliding panel 228 are closed together.

FIG. 10(b) to (e) show different stages in a process of a PRM using the lavatory unit of the second embodiment with the aid of an assistant. In FIG. 10(b) the PRM is seated in the aircraft wheelchair and enters the lavatory unit 203 facing forward via the opening between door 210 and sliding panel 228. The PRM moves forward within the lavatory unit 203 until both the PRM and the assistant are inside lavatory unit 203 and the door 210 and slidable panel 228 are brought together to close off the lavatory unit 203 from the cabin as shown in FIG. 10(c). The PRM can then transfer with the aid of the assistant from the wheelchair to the toilet 214 via the position shown in FIG. 10(d) to a final position shown in FIG. 10(e). While inside the lavatory unit 203 the assistant stands facing door 210 and is forward of the PRM, while the wheelchair is located within the space created by moveable wall assembly 152.

Figure 11:
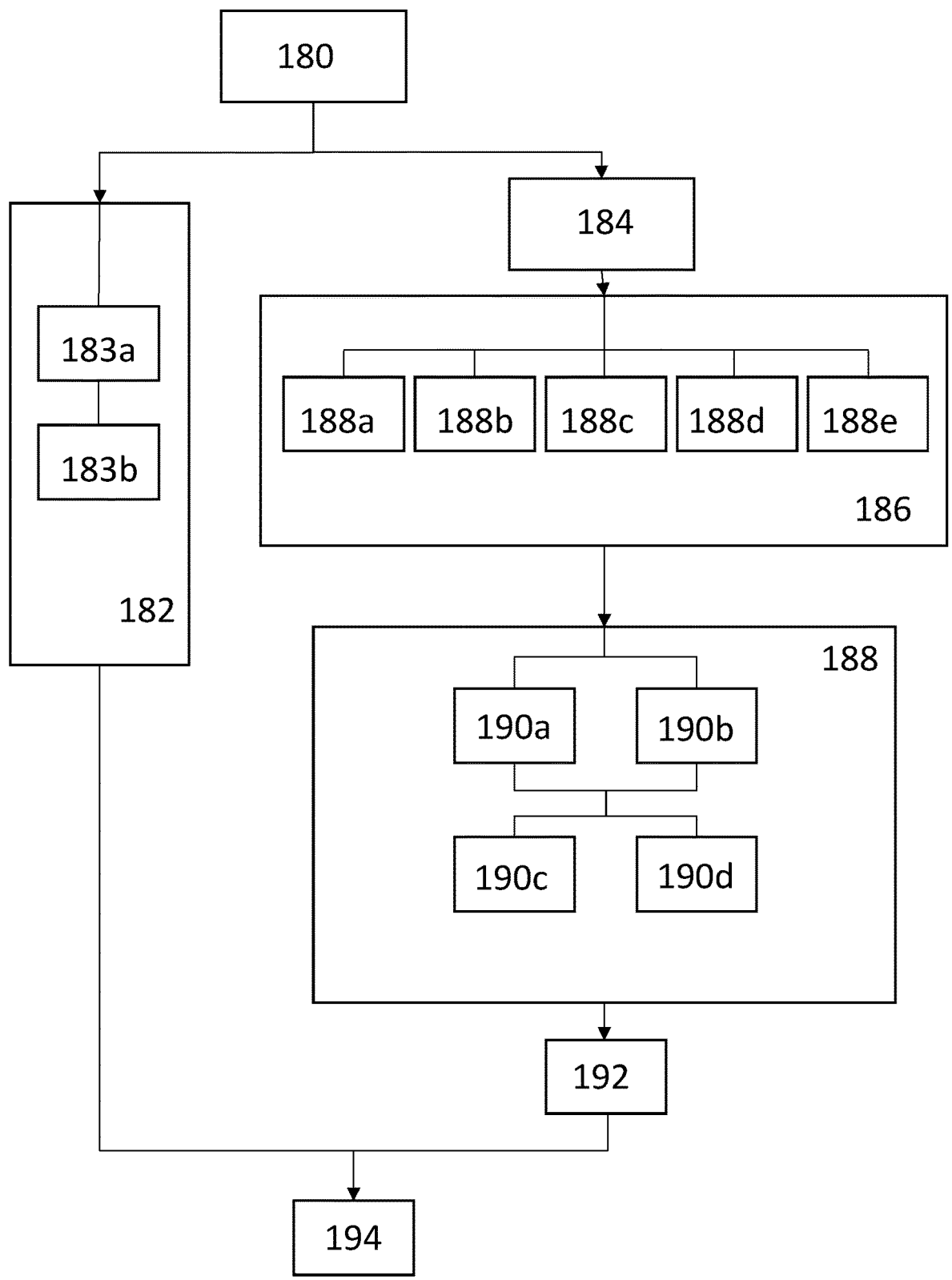

FIG. 11 shows a flow chart of a method of using the lavatory of the first example embodiment. The lavatory unit 103 is in the able-bodied configuration during taxiing and take-off 180. In flight, an able-bodied user may access 182 the lavatory unit 103 without any reconfiguration required. As part of the process the door 110 is opened 183a to created opening 140 and closed 183b to close off the lavatory unit from the cabin 1. In the event a PRM requires access 184, flight crew reconfigures 186 the lavatory unit 103 from the able-bodied configuration to the PRM-accessible configuration. The step of reconfiguring 186 the lavatory unit 103 comprises moving 188a inboard portion 118b aft, bi-fold panel 126 unfolding 188b, sliding panel 128 sliding 188c aft, ceiling panel 146 sliding 188d aft and sliding 188e insert panel 144 (i.e. moving movable assembly 152). A PRM may then access 188 the lavatory unit 103. A part of the process of a PRM accessing 188 the lavatory unit 103 the door 110 is opened 190a and sliding panel 128 is slid 190b forward to create opening 148 via which the PRM can enter the lavatory unit 103. Door 110 is then closed 190c and sliding panel 128 is slid 190d backwards to close opening 148 and close off the lavatory unit from the cabin. After the PRM has accessed the lavatory unit 103, the lavatory unit 103 is then reconfigured 192 from the PRM-accessible configuration to the able-bodied configuration prior to landing 194. It will be appreciated that both able-bodied user and PRMs may access the lavatory unit multiple times during a single flight and accordingly steps 182 to 192 may be repeated multiple times.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A lavatory unit for an aircraft cabin,
   wherein the lavatory unit comprises a perimeter wall that separates an internal space of the unit from space external to the unit, and is configurable between an able-bodied configuration and a Person of Reduced Mobility (PRM)-accessible configuration, wherein the PRM-accessible configuration of the lavatory unit accommodates a PRM in a wheelchair and allows for a transfer from the wheelchair to the toilet,
   wherein in the able-bodied configuration the lavatory unit has a first internal floor space and there is a cabin floor space external to the lavatory unit,
   wherein the lavatory unit is expandable into the PRM-accessible configuration in which the lavatory unit is expanded to have a second internal floor space, the second internal floor space encompassing a region of the cabin floor space
   wherein the perimeter wall comprises a moveable wall assembly, and in the able-bodied configuration the moveable wall assembly is in a retracted configuration, and the moveable wall assembly is moveable into an expanded configuration to expand the lavatory unit into the PRM-accessible configuration; and
   wherein in the able-bodied configuration a user can access the first internal floor space via a door opening in the perimeter wall, the door opening having an effective width and wherein movement of the moveable wall assembly from the retracted configuration to the expanded configuration increases the effective width of said door opening to enable a PRM to access the internal floor space.

2. The lavatory unit according to claim 1, wherein the lavatory unit comprises at least one panel assembly configured to cover a gap that would otherwise be created in the perimeter wall of the lavatory unit when the lavatory unit is expanded.

3. The lavatory unit according to claim 2, wherein the at least one panel assembly comprises a foldable panel that expands by unfolding.

4. The lavatory unit according to claim 2, wherein the at least one panel assembly comprises a sliding panel mounted for movement relative to the moveable wall assembly, and wherein the panel slides from a first position when the lavatory unit is in the able-bodied configuration to a second position when the lavatory unit is in the PRM-accessible configuration and thereby covers a gap that would otherwise be created in the perimeter wall of the lavatory unit as the moveable wall assembly moves between the retracted configuration and the expanded configuration.

5. The lavatory unit according to claim 1, wherein when the moveable wall assembly is in the retracted configuration the door assembly is operable to an open position in which an able-bodied user can access the first internal floor space via the door opening in the perimeter wall, said door opening having a first effective width when the moveable wall assembly is in the retracted configuration;
wherein when the moveable wall assembly is in the expanded configuration the door assembly is operable to an open position in which a PRM can access the internal floor space via the door opening in the perimeter wall, said door opening having a second effective width when the moveable wall assembly is in the extended configuration; and
wherein the second effective width is greater than the first effective width.

6. The lavatory unit according to claim 5, wherein the moveable wall assembly comprises the door assembly.

7. The lavatory unit according to claim 6, wherein the door assembly comprises a primary door and a secondary door,
wherein the primary door provides access to the door opening when the moveable wall assembly is in the retracted configuration; and
the primary door and the secondary door cooperate to provide access to the door opening when the moveable wall assembly is in the extended configuration.

8. The lavatory unit according to claim 1, the lavatory unit comprising a crew seat mounted on an inboard side of the unit.

9. The lavatory unit according to claim 1, the lavatory unit comprising a toilet, and
wherein in the PRM-accessible configuration, the interior space comprises a recess sized and shaped to receive the knees of a PRM sitting on the toilet and/or a PRM sitting in a wheelchair received within the lavatory unit.

10. The lavatory unit according to claim 1, the lavatory unit comprising a sink located adjacent an inboard and/or forward side of the unit.

11. The lavatory unit according to claim 1, wherein the maximum length of the lavatory unit in the able-bodied configuration is no more than 38 inches.

12. An aircraft comprising a lavatory unit according to claim 1.

13. The aircraft according to claim 12, the aircraft cabin comprising a row of seats, an aircraft door, and an egress pathway associated with the aircraft door;
wherein the lavatory unit is located aft of the row of seats and immediately adjacent to the egress pathway.

14. The lavatory unit according to claim 2, wherein the moveable wall assembly comprises said at least one panel assembly, and said at least one panel assembly is configured to cover a gap that would otherwise be created in the perimeter wall of the lavatory unit when the moveable wall assembly moves from the retracted configuration to the expanded configuration.

15. The lavatory unit according to claim 5, wherein in the able-bodied configuration the door assembly is operable to a closed position in which the door assembly prevents access to the first internal floor space via said door opening having the first effective width; and
wherein in the PRM-accessible configuration the door assembly is operable to a closed position in which the door assembly prevents access to the internal floor space via said door opening having the second effective width.

16. The lavatory unit according to claim 1, wherein the lavatory unit is a single-toilet lavatory unit.

17. A method of reconfiguring an aircraft lavatory unit to enable access by a Person of Reduced Mobility (PRM), the method comprising moving a moveable wall assembly of the lavatory unit to:
(i) expand the lavatory unit from an able-bodied configuration to a PRM-accessible configuration in which the lavatory unit accommodates a PRM in a wheelchair, such that cabin floor space that was located outside the lavatory unit prior to the expansion is encompassed within the internal floor space of the lavatory unit after expansion; and
(ii) increase an effective width of a door opening in a perimeter wall of the lavatory unit thereby enabling a PRM in a wheelchair to access the internal floor space.

18. The method according to claim 17, wherein the lavatory unit comprises displacing the moveable wall assembly.

19. The method according to claim 18, wherein expanding the lavatory unit
comprises displacing the moveable wall assembly rearwards relative to the aircraft.

20. A lavatory unit for an aircraft cabin,
wherein the lavatory unit comprises a perimeter wall that separates an internal space of the unit from space external to the unit, and is configurable between an able-bodied configuration and a Person of Reduced Mobility (PRM)-accessible configuration, wherein the PRM-accessible configuration of the lavatory unit accommodates a PRM in a wheelchair,
wherein in the able-bodied configuration the lavatory unit has a first internal floor space and there is a cabin floor space external to the lavatory unit,
wherein the perimeter wall comprises a moveable wall assembly, and in the able-bodied configuration the moveable wall assembly is in a retracted configuration, and the moveable wall assembly is moveable to expand the lavatory unit into the PRM-accessible configuration in which the lavatory unit has a second internal floor space, the second internal floor space encompassing a region of the cabin floor space; and
wherein in the able-bodied configuration a user can access the first internal floor space via a door opening in the perimeter wall, the door opening having a first effective width less than the shoulder width of a $95^{th}$ percentile man and wherein movement of the moveable wall assembly from the retracted configuration to the expanded configuration increases the effective width of said door opening to provide a second effective width greater than the shoulder width of a $95^{th}$ percentile man.

* * * * *